United States Patent
Akenine-Moller et al.

(10) Patent No.: US 9,754,345 B2
(45) Date of Patent: Sep. 5, 2017

(54) COMPRESSION AND DECOMPRESSION OF GRAPHICS DATA USING PIXEL REGION BIT VALUES

(71) Applicant: INTEL CORPORATION, Santa Clara, CA (US)

(72) Inventors: Tomas G Akenine-Moller, Lund (SE); Jim K Nilsson, Lund (SE); Prasoonkumar Surti, Folsom, CA (US); Jon N Hasselgren, Bunkeflostrand (SE); Carl J Munkberg, Malmo (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/060,317

(22) Filed: Mar. 3, 2016

(65) Prior Publication Data

US 2016/0189338 A1    Jun. 30, 2016

Related U.S. Application Data

(63) Continuation of application No. 13/924,151, filed on Jun. 21, 2013, now Pat. No. 9,305,368.

(51) Int. Cl.
| | |
|---|---|
| *G06K 9/46* | (2006.01) |
| *G06T 1/60* | (2006.01) |
| *G06T 9/00* | (2006.01) |
| *G06T 7/40* | (2017.01) |
| *G06T 11/00* | (2006.01) |
| *G06T 7/90* | (2017.01) |

(52) U.S. Cl.
CPC .............. *G06T 1/60* (2013.01); *G06K 9/4652* (2013.01); *G06T 7/408* (2013.01); *G06T 7/90* (2017.01); *G06T 9/00* (2013.01); *G06T 11/00* (2013.01); *G06K 2009/4666* (2013.01); *G06T 2200/28* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 6,009,200 A | * | 12/1999 | Fujita | G06K 9/4609 375/E7.078 |
| 6,192,155 B1 | * | 2/2001 | Fan | G06T 9/00 382/232 |
| 6,606,417 B1 | * | 8/2003 | Brechner | G06F 17/3025 382/240 |
| 6,683,979 B1 | * | 1/2004 | Walker | G06T 9/005 358/539 |
| 6,990,249 B2 | * | 1/2006 | Nomura | G06T 5/20 348/580 |
| 7,505,624 B2 | * | 3/2009 | Ogden | H04N 1/644 382/166 |

(Continued)

OTHER PUBLICATIONS

Supplementary European Search Report for EP14813559, dated Oct. 21, 2016, 8 pages.

(Continued)

*Primary Examiner* — Andrae S Allison
(74) *Attorney, Agent, or Firm* — Jordan IP Law, LLC

(57) ABSTRACT

Techniques related to graphics rendering including techniques for compression and/or decompression of graphics data by use of pixel region bit values are described.

30 Claims, 11 Drawing Sheets

(56) References Cited

U.S. PATENT DOCUMENTS

| | | | | |
|---|---|---|---|---|
| 2004/0161146 A1* | 8/2004 | Van Hook | ............... | H04N 1/644 |
| | | | | 382/166 |
| 2006/0103658 A1* | 5/2006 | Liao | ....................... | G09G 5/022 |
| | | | | 345/545 |
| 2006/0188163 A1* | 8/2006 | Elder | ..................... | H04N 1/644 |
| | | | | 382/232 |
| 2006/0215914 A1* | 9/2006 | Aleksic | ................ | H04N 19/124 |
| | | | | 382/232 |
| 2010/0296745 A1* | 11/2010 | Strom | .................. | H04N 19/176 |
| | | | | 382/233 |
| 2014/0369614 A1* | 12/2014 | Fenney | .................. | H04N 19/59 |
| | | | | 382/233 |

OTHER PUBLICATIONS

Claudia Dolci, Dante Salvini, MichaelSchrattner, Robert Weibel: "Structures fo r Data compression", GITTA—Geographic Information Technology Training Alliance, Jun. 18, 2010 (Jun. 18, 2010), pp. 1-30, XP002762642, Retrieved from the Internet: URL:http ://www.gitta.info [retrieved on Oct. 6, 2016].

\* cited by examiner

800

```
┌─────────────────────────────────────────────┐
│ Determine Values associated with Individual │
│            Pixels of a Tile of              │
│                   Pixels                    │
│                    802                      │
└─────────────────────────────────────────────┘
                      │
                      ▼
┌─────────────────────────────────────────────┐
│   Determine Pixel Regions of the Tile of    │
│                   Pixels                    │
│                    804                      │
└─────────────────────────────────────────────┘
                      │
                      ▼
┌─────────────────────────────────────────────┐
│ Determine an Individual Pixel Region has    │
│       Pixel Values having a                 │
│            Single Distinct Value            │
│                    806                      │
└─────────────────────────────────────────────┘
                      │
                      ▼
┌─────────────────────────────────────────────┐
│ Set a Pixel Region Value for the Individual │
│   Pixel Region Indicating the Pixel Region  │
│         has a Single Distinct Value         │
│                    808                      │
└─────────────────────────────────────────────┘
                      │
                      ▼
┌─────────────────────────────────────────────┐
│ Store Graphics Data Including the Pixel     │
│   Region Value and the Single Distinct Value│
│                    810                      │
└─────────────────────────────────────────────┘
```

FIG. 8

COMPRESSION AND DECOMPRESSION OF GRAPHICS DATA USING PIXEL REGION BIT VALUES

BACKGROUND

In general, graphics rendering may generate an image or images from model data using a wide range of computer implemented techniques. In some graphics rendering implementations, an image may be rendered using rasterization by sampling different functions such as, for example, a visibility function (e.g., a function to determine whether a sample point is inside a triangle) and/or a shading function (e.g., a function to determine the color at a certain sample point), or the like. In general, the samples for a visibility function may be termed visibility samples and the samples for a shading function may be termed shading samples.

In some implementations, such as, for example, supersampling anti-aliasing (SSAA) applications, the number of visibility samples per pixel may match the number of shading samples per pixel. In other implementations, such as, for example, multi-sampling anti-aliasing solution (MSAA) applications, there may be a single shading sample per pixel and multiple visibility samples per pixel. In either case, the multiple samples may improve image or video quality, such as, for example, reducing jagged edge effects in images and crawling effects in video, or the like.

In general, using SSAA or MSAA or other graphics techniques may require a color buffer bandwidth increase or an increased bandwidth in other buffers. Such bandwidth increases may decrease system performance such as causing more cache line transactions, increasing memory usage, increasing power usage, or the like. Therefore, compression of graphics data may be advantageous. Furthermore, in instances where SSAA and MSAA are not used, color buffer bandwidth usage may be significant and compression techniques may be advantageous in such instances as well.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 8 is a flow chart illustrating an example process;

DETAILED DESCRIPTION

Figure 1:
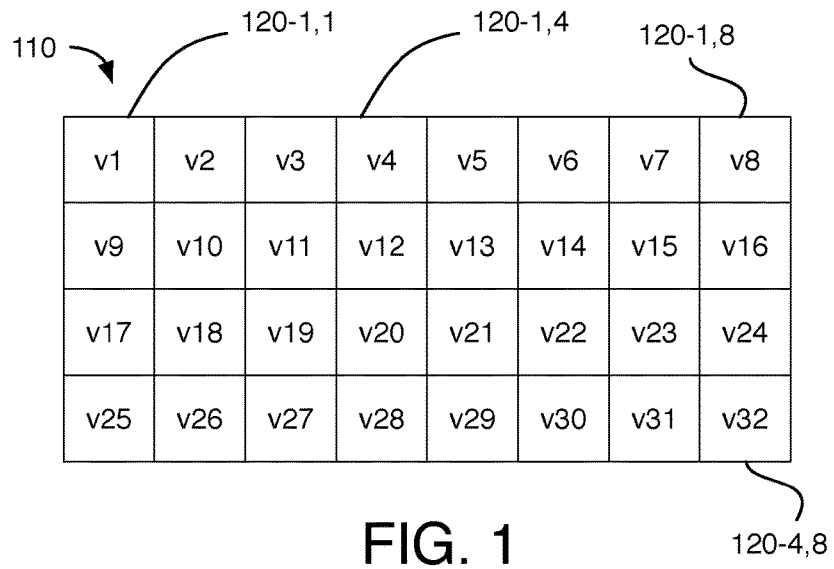
FIG. 1 is an illustrative diagram of an example tile of pixels having associated values.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to graphics rendering including techniques for compression and/or decompression of graphics data by use of pixel region bit values and/or pixel indicator values.

As described above, it may be advantageous to compress (and decompress) graphics data such as rendered graphics data. As will be described in greater detail below, in some examples, graphics rendering and compression techniques may operate on tiles. In general, a tile may include any number of individual pixels, such as a rectangular region of W×H pixels, where W is the width of a tile and H is the height of a tile in pixels. For example, a tile may include an 8×4 pixels having 32 pixels. In some examples, values may be determined for the individual pixels such that each pixel has a value. The values may be determined in any matter and may include any suitable information. For example, the values may include color values, surface normal values, multi-sampling anti-aliasing color plane values, or the like. The tile of pixels may be divided into pixel regions such that each pixel is in one and only one pixel region. For example, an 8×4 tile of pixels may be divided into 8 pixel regions of 2×2 pixels each. For the individual pixel regions, it may be determined whether the pixel region has a single distinct value (or if the pixel region has two or more distinct values). If an individual pixel region has a single distinct value, the individual pixel region may be assigned a pixel region value or bit value (e.g., a bit value of "1") to indicate the individual region has a single distinct value. Furthermore, for the individual pixel region, only the single distinct value may be stored or saved (and the repetitive other three values may be discarded). If, however, the individual pixel region includes two or more distinct values, a pixel region value or bit value for the individual pixel region may be set (e.g., to a bit value of "0") and all of the values in the individual pixel region may be stored or saved.

In other examples, individual pixel regions having a single distinct value may be handled as described (i.e., assigned a bit value of "1" and only the single distinct value may be stored), but individual pixel regions may be further compressed. In such examples, individual pixel regions having two distinct values may be assigned a pixel region value or bit value (e.g., a bit value of "2") and only the two distinct values may be stored or saved. In such examples, an additional value or bit value must be assigned to each pixel in the individual pixel region to indicate which of the two values is associated with each pixel. In some examples, a pixel indicator value may be assigned to each pixel to indicate which of the two distinct values are associated with the pixel. In such examples, pixel regions having three or more distinct values may be assigned a pixel region value or bit value (e.g., a bit value of "0") and all of the values in such a pixel region may be stored or saved. Such examples employing pixel region values and pixel indicator values may be described as a quad bit technique and those that are used for color data may be described as a quad palette technique.

Using such techniques, the number of pixel values that need to be stored or saved may be reduced dramatically as compared with standard techniques, which store or save each pixel value, for example. Therefore, the techniques as discussed herein may provide data compression and techniques described related to using compressed graphics data to determine values for pixels of a tile may provide for data decompression. Further, the described techniques may be applied before standard compression and decompression ("codec") techniques, which may further compress the graphics data prior to storage, for example. Similarly, such further codec techniques may be applied to stored graphics data before the data is decompressed as discussed herein.

As is discussed in greater detail below, in general, the aim of the discussed compression techniques may be to achieve a bit budget. For example, memory bandwidth may be associated with a limit or a specific cache line size or the like which may provide limits (e.g., 512 bits per cache line or the like) for memory transactions. If a compression technique may transmit or store data less than the limit, the number of transactions associated with the data may be reduced saving power and increasing performance. As discussed, a tile of individual pixels may be divided into pixel regions and pixel region values and/or pixel indicator values may be associated with the pixel regions and/or pixels such that the values associated with the pixels of the tile may be reduced. In general, if the pixel region values, pixel indicator values, and/or the remaining pixel values are less than the desired bit budget, the compression may have succeeded. In such examples, graphics data comprising the pixel region values, pixel indicator values, and/or the remaining pixel values may be stored in memory. In general, if the bit budget is not met, the compression may have failed and the individual pixel values may be stored uncompressed using standard techniques. Alternatively, if the compression failed, further codec techniques (as discussed) may be applied and the resultant data may again be compared to the bit budget. If the bit budget is met, the further compressed graphics data may be stored and if the budget is not met, the uncompressed pixel values may be stored. As discussed, compressing pixel values of a tile of pixels may save significant bandwidth while transferring or storing graphics data in various computer implementations. Such bandwidth savings may increase performance and/or reduce power consumption in various devices.

FIG. 1 is an illustrative diagram of an example tile 110 of pixels 120 having associated values v1-v32, arranged in accordance with at least some implementations of the present disclosure. As shown, tile 110 may include multiple pixels 120-1,1-120-4,8. In general, tile 110 may include any number of pixels. In some examples, tile 110 may be 8 pixels wide by 4 pixels high (and may therefore include 32 pixels, as shown). Also as shown, individual pixels 120-1,1-120-4,8 may have or include an associated value v1-v32. In general, values v1-v32 may include any suitable graphics data or rendering data, or the like. For example, values v1-v32 may include color values, surface normal values, or the like. In other examples, values v1-32 may include low frequency shading color values or the like. In general, any number of values v1-v32 may be distinct. For example, if all of values v1-v32 are the same, there may be a single distinct value. If all of values v1-v32 are different, there may be 32 distinct values. In general, the compression techniques discussed herein below may be more effective if there are fewer distinct values, particularly if those fewer distinct values are bunched in various regions of tile 110 as illustrated below. Such examples may be more likely to occur in various rendering contexts or using various techniques, such as, for example, when values v1-v32 are surface normal values, or the like.

As discussed, in some implementations, shading may be computed at a lower rate than once per pixel. For example, color values may be generated for every 1×2 pixels, every 2×1 pixels, every 2×2 pixels, every 4×2 pixels, every 2×4 pixels, every 4×4 pixels, or the like. In other examples, pixel shading may be split into two parts, such that one portion of the shading may be done per pixel (or per sample) and the other portion of the shading may be done at a lower rate, as described, and the results combined In such examples, since color values are generated for regions larger than a per-pixel basis, a certain amount of duplication of values for tile 110 will occur. Further, in rendering real objects, it may be a frequent occurrence that a group of pixels may have the same color or that an entire tile of pixels may have the same color. The techniques discussed herein may be particularly advantageous in such examples, although the described techniques are not limited to such examples.

Figure 2:
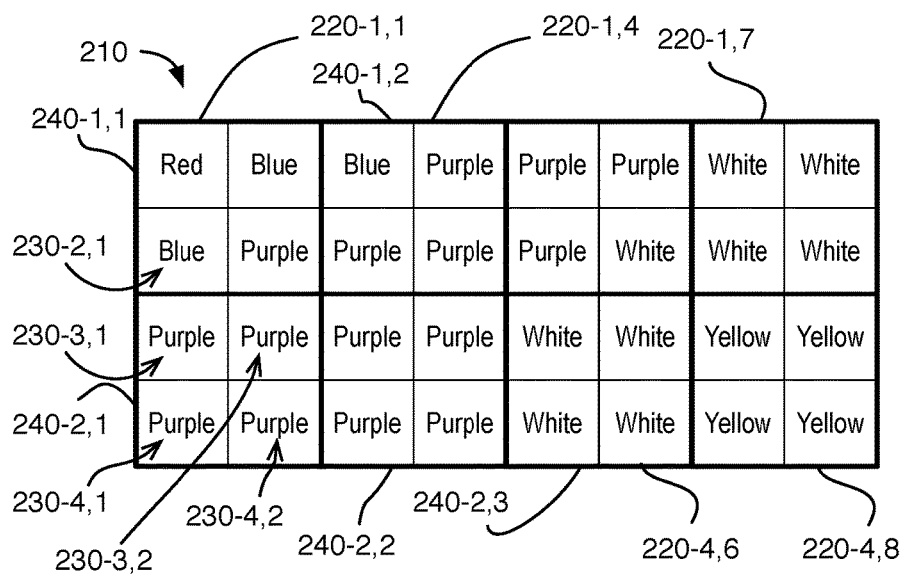
FIG. 2 is an illustrative diagram of an example tile of pixels having associated values.

FIG. 2 is an illustrative diagram of an example tile 210 of pixels 220 having associated values 230, arranged in accordance with at least some implementations of the present disclosure. As shown, in some examples, values 230 may include color values or the like. In the illustrated example, values 230 are shown using a description (i.e., "Red", "Blue", "Purple", "White" and "Yellow") for the sake of clarity of presentation. In general, color values may include red green blue alpha (RGBA) color values, a subset of RGBA values such as 8-bit red green blue alpha (R8G8B8A8) color values, pseudo luminance/intensity orange chrominance green chrominance alpha (YCoCgA) color values, or the like. Further, although described with respect to color values, in general, values 230 may include any graphics data or rendering values such as, for example, surface normal values or the like. In the example of FIG. 2, tile 210 may include five distinct values (i.e., "Red", "Blue", "Purple", "White" and "Yellow"). As will be appreciated, tile 210 may include from 1 to 32 distinct values. In general, values 230 may be determined using any suitable graphics processing technique or techniques. For example, values 230 may be generated by rendering tile 210. The rendering may include a rasterization technique such as applying a visibility function or applying a shading function or the like. In some examples, the rendering may include applying a super-sampling anti-aliasing technique, a multi-sampling anti-aliasing technique, or the like. In some examples, the rendering may include applying low frequency shading color techniques or the like.

As shown in FIG. 2, tile 210 may be divided into pixel regions 240. For example, tile 210 may be divided into 8 2×2 pixel regions 240, as shown such that pixel region 240-1,1 may include pixels 220-1,1, 220-1,2, 220-2,1, and 220-2,2, pixel region 240-2,3 may include pixels 220-3,5, 220-3,6, 220-4,5, and 220-4,6 and so on. In general, tile 210 may be divided into any number of pixel regions 240. In the illustrated example, an 8×4 tile has been divided into 8 2×2 pixel regions. In some examples, the pixel regions may be 4×4 pixels, 3×3 pixels, 1×2 pixels, 2×1 pixels, or the like. In some examples, the most advantageous region sizes may be those that divide tile 210 into pixel regions of equal sizes. In other examples, region sizes may be used that divide tile 210 into pixel regions of unequal sizes. For example, a tile may be divided into 4×4 pixel regions (or 3×3 pixel regions) in some parts of the tile, 2×2 pixel regions in other parts of the tile, and 1×1 elsewhere in the tile, and so on. In some examples, the sizes and/or configurations of the pixel regions may be varied based on values 230. In general, each pixel region and each pixel of tile 210 in FIG. 2 (and in the other FIGS. herein) are not each labeled for the sake of clarity of presentation.

Figure 3:
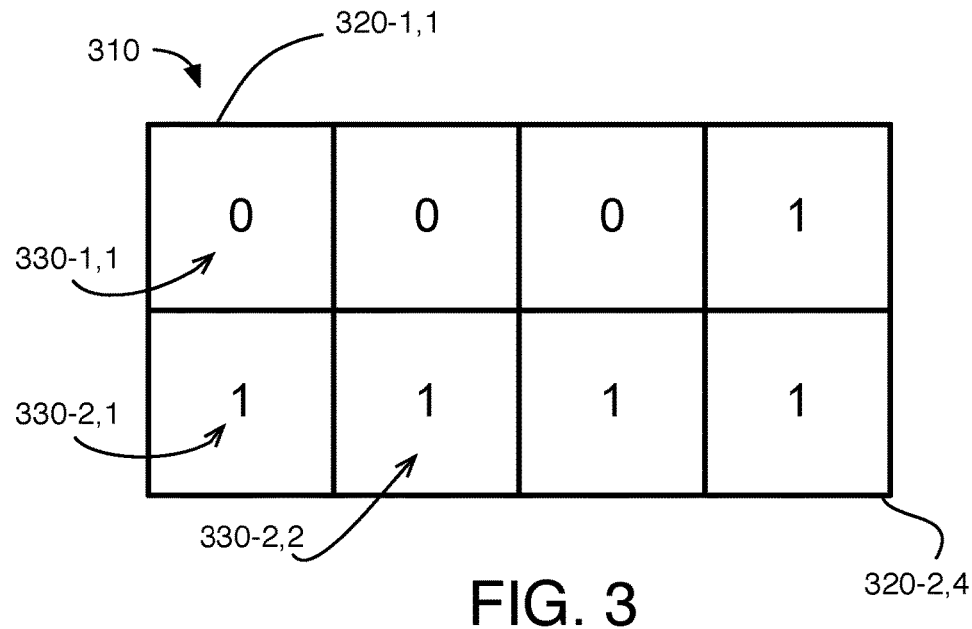
FIG. 3 is an illustrative diagram of an example tile of pixel regions with associated pixel region values.

Turning now to FIG. 3, FIG. 3 is an illustrative diagram of an example tile 310 of pixel regions 320 with associated pixel region values 330, arranged in accordance with at least some implementations of the present disclosure. For example, tile 310 may be related to tile 210 such that, for individual pixel regions 240, if the associated pixel values 230 include a single distinct value (please refer to FIG. 2), the associated individual pixel region 320 of FIG. 3 may include a pixel region value 330 of "1". If the associated pixel values 230 include two or more distinct values, the associated pixel region 320 may include a pixel region value 330 of "0". For example, pixel region 240-1,1 of tile 210 includes three distinct values ("Red", "Blue", and "Purple") and, therefore, pixel region value 330-1,1 is "0". Further, pixel region 240-2,2 includes a single distinct value ("Purple") and pixel region value 330-2,2 is "1". In the illustrated example, a pixel region value may include a bit value of either "0" or "1". For example, it may be determined whether, for an individual pixel region, the subset of values associated with the subset of individual pixels corresponding to the individual pixel region includes a single distinct value. If it does, a pixel region value may be set to a bit value indicating the pixel region has a single distinct value (e.g., "1" as illustrated). If it does not, the pixel region may be set to a value indicating the pixel region does not have a single district value (e.g., "1" as illustrated). In general, any pixel region value or bit value or the like may be used to indicate whether a pixel region has a single distinct value.

Figure 4:
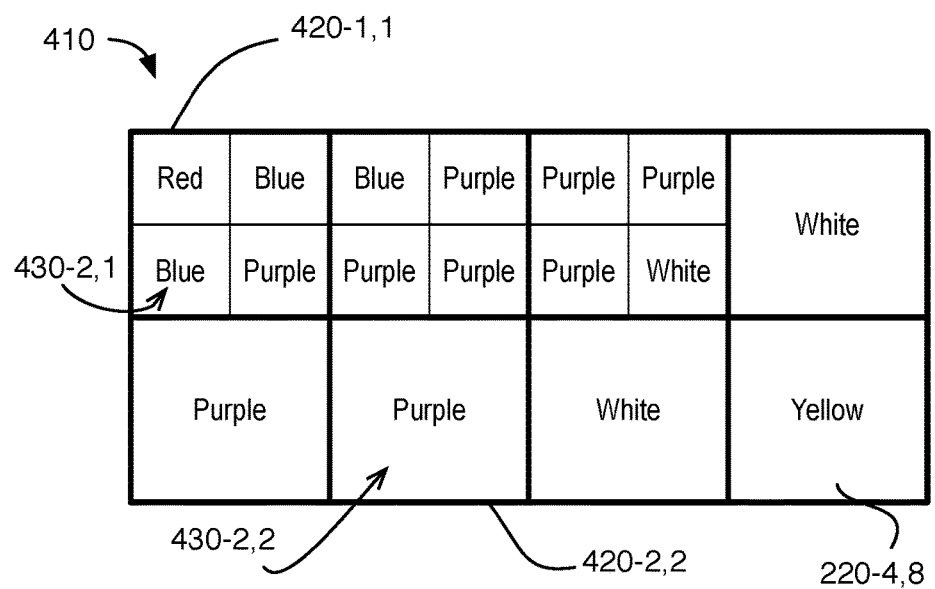
FIG. 4 is an illustrative diagram of an example tile of pixel regions having some pixel regions with a single distinct value and other pixel regions with two or more distinct values.

FIG. 4 is an illustrative diagram of an example tile 410 having some pixel regions 420 with a single distinct value and other pixel regions 420 with two or more distinct values, arranged in accordance with at least some implementations of the present disclosure. For example, as shown in FIG. 4, some pixel values may be eliminated or discarded as repetitive. In general, values 430 may be considered retained pixel values 430, or the like. As shown with respect to pixel region 420-2,2, a single distinct value 430-2,2 (e.g., "Purple") may be retained for pixel region 420-2,2. As discussed, in general, for an individual pixel region having a single distinct value, only one value (e.g., the single distinct value) may be retained for the individual pixel region repetitive pixel values may be discarded.

Also as shown in FIG. 4, for pixel regions such as, for example, pixel region 420-1,1, the pixel region may have included two or more distinct values (please refer to FIGS. 2 and 3). For such pixel regions, graphics data stored for tile 410 may include each of the pixel values such as, for example, pixel values 430-1,1 ("Red"), 430-1,2 ("Blue"), 430-2,1 ("Blue"), and 430-2,2 ("Purple"). As discussed, in general, for an individual pixel region having two or more distinct values, all of the values may be retained and, in such pixel regions, substantially no compression may have be attained, for example.

As is discussed further herein, in storing or saving graphics data associated with tile 410, eliminating repetitive pixel values may save memory, memory bandwidth transactions, or the like and may improve system performance. For example, such compression techniques may meet a bit budget as described herein. In some examples, the graphics data may be further compressed using standard codecs to meet a bit budget or a more stringent bit budget, or the like. In particular, standard techniques for saving or storing (or passing along to a codec) graphics data associated with tile 210 may provide a value for each pixel 220 (please refer to FIG. 2), repeating a substantial number of pixel values 230 in some implementations. In contrast, graphics data associated with tile 410 may be substantially compressed using the techniques described herein without loss of information.

As discussed above, the aim of the described compression techniques may be to achieve a bit budget. For example, if tile 210 may use $2^n$ bits in an uncompressed format, a desired bit budget, B, may be $B=2^{n-1}$ bits. In other examples, the desired bit budget, B, may be $B=2^{n-2}$ bits, $B=3*B^{n-2}$ bits, or the like. In other examples, the bit budget may be associated with a system design rule or constraint or the like. For example, memory bandwidth may be associated with a limit or a cache line or the like which may provide limits (e.g., 512 bits or the like) for memory transactions. In some examples, an uncompressed tile 210 may require 1024 ($2^{10}$) bits in uncompressed form and a desired bit budget may be to compress it to 512 ($2^9$) bits. Further, in some examples, more than one bit budgets may be available such that, the aim or goal may be to meet the lowest of the available bit budgets. In any event, if a compression technique may transmit or store data less than the bit budget or limit, the number of transactions associated with the data may be reduced saving power and increasing performance.

In the described example, the number of bits needed to store pixel region values 330 may be 8 bits (one for each pixel region) and, the number of bits needed to store the pixel values may vary depending on the number of eliminated or discarded pixel values. In the given example, the number of pixel values to be stored or saved (or further compressed in some examples) is 17. Referring to FIG. 4, for example, a single value may be stored for each for the pixel regions having a single distinct value (e.g., pixel regions 420-1,4, 420-2,1, 420-2,2, 420-2,3, and 420-2,4) and four values may be stored each for pixel regions having two or more distinct values (e.g., pixel regions 420-1,1, 420-1,2, and 420-1,3).

Depending on the desired bit budget, as discussed, graphics data associated with FIGS. 3 and 4 may meet the desired bit budget. In the given example, the number of pixel values has been reduced from 32 to 17, which may facilitate achieving the bit budget in various examples. If the desired bit budget is met, the graphics data may be stored using the described compression techniques. If the desired bit budget is not met, the graphics data may be stored uncompressed or the graphics data may be further compressed using standard codecs. The further compressed data may be compared to the bit budget. If the bit budget is achieved, the graphics data may be stored in further compressed form. If not, the graphics data may be stored in an uncompressed form. In general, if the graphics data can be compressed (i.e., either using the described techniques or using the described technics and further standard codecs) to meet a bit budget, system performance may increase. However, if the compression technique does not meet a bit budget, it may be advantageous to store the graphics data uncompressed since no cache line transactions have been saved and a decompression step may be eliminated when accessing the graphics data, for example.

Figure 10:
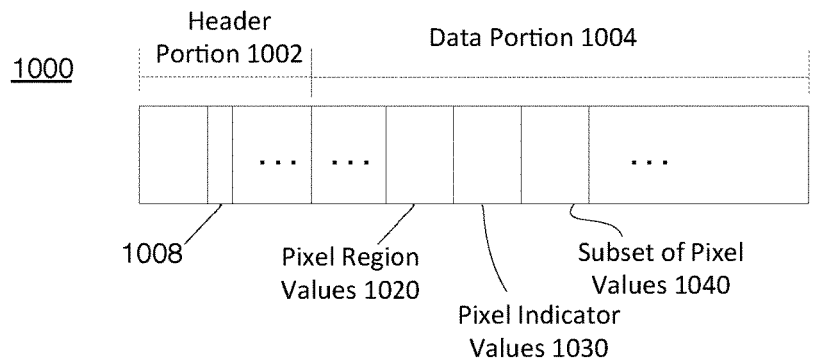
FIG. 10 is an illustrative diagram of example graphics data.

Turning now to FIG. 10, FIG. 10 is an illustrative diagram of example graphics data 1000, arranged in accordance with at least some implementations of the present disclosure. As shown in FIG. 10, graphics data 1000 may include a header portion 1002 and/or a data portion 1004. Also as shown, header portion 1002 may include one or more indicators 1008. For example, indicator 1008 may include a flag or the like indicating whether data portion 1004 is compressed according to the techniques described herein. Header portion 1002 may include other indicators such as an indicator indicating whether data portion 1004 or various components of data portion 1004 are compressed, or the like. As shown, data portion 1004 may include pixel region values 1020, pixel indicator values 1030 (as discussed further herein), and/or subset of pixel values 1040. In some examples, pixel region values 1020 may include pixel region values 330. In some examples, subset of pixel values 1040 may include retained pixel values 430 such that a portion of pixel values 230 are not contained in graphics data 1000 as discussed. As described herein, graphics data 1000 may be stored in memory or retrieved from memory and decompressed. As also discussed herein, data portion 1004 of graphics data 1000 may be stored in memory in a further compressed form based on a compression using a standard codec or the like. The header portion 1002, and the data portion 1004 may, in some implementations, be stored in separate physical memory areas and be backed by different caching mechanisms.

As discussed with respect to FIGS. 2-4, in some examples, a tile of pixels may be divided into pixel regions such that each pixel is in one and only one pixel region. For the individual pixel regions, it may be determined whether the pixel region has a single distinct value (or if the pixel region has two or more distinct values). If an individual pixel region has a single distinct value, the individual pixel region may be assigned a pixel region value or bit value to indicate the individual region has a single distinct value. Furthermore, for the individual pixel region, only the single distinct value may be stored or saved (and the repetitive other three values may be discarded). If, however, the individual pixel region includes two or more distinct values, a pixel region value or bit value for the individual pixel region may be set (e.g., to a bit value of "0") and all of the values in the individual pixel region may be stored or saved.

In other examples, individual pixel regions having a single distinct value may be handled or compressed in the same manner, however, individual pixel regions having two distinct values may be further compressed as will be described below with respect to FIGS. 5-8.

Figure 5:
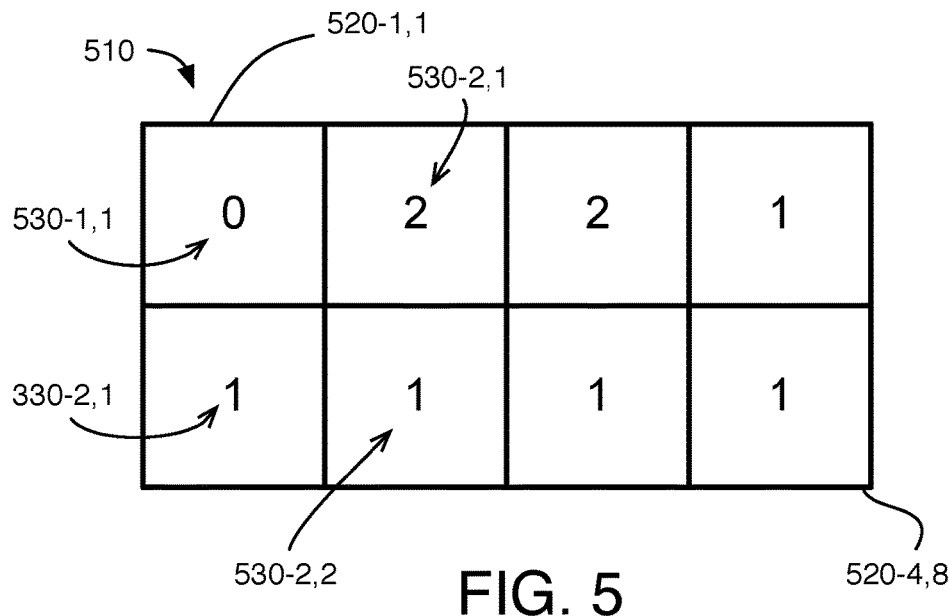
FIG. 5 is an illustrative diagram of an example tile of pixel regions with associated pixel region values.

FIG. 5 is an illustrative diagram of an example tile 510 of pixel regions 520 with associated pixel region values, arranged in accordance with at least some implementations of the present disclosure. For example, tile 510 may be generated from tile 210. For example, for individual pixel regions 240, if the associated pixel values 230 include a single distinct value (please refer to FIG. 2), the associated individual pixel region 520 of FIG. 5 may include a pixel region value of "1". Continuing the example, if the associated pixel values 230 include two, the associated pixel region 320 may include a pixel region value 330 of "2". Further to the present example, if the associated pixel values 230 include three or more distinct values, the associated pixel region 520 may include a pixel region value of "0".

For example, pixel region 240-1,1 of tile 210 includes three distinct values ("Red", "Blue", and "Purple") and, therefore, pixel region value -1,1 is "0". Further, pixel region 240-2,2 includes a single distinct value ("Purple") and pixel region value -2,2 is "1". Further still, pixel region 240-1,2 includes two distinct values ("Blue" and "Purple") and pixel region -1,2 is "2". In the illustrated example, a pixel region value may include a bit value of "0" or "1" or "2". In general, three available options may require 2-bits to indicate for example. In general, any number of bits or bit combinations may be use to label or indicate the described pixel region values. In the described example, it may be determined whether, for an individual pixel region, the subset of values associated with the subset of individual pixels corresponding to the individual pixel region includes a single distinct value, two distinct values, or three or more distinct values. If an individual pixel region includes a single distinct value, a pixel region value may be set to a bit value indicating the pixel region has a single distinct value (e.g., "1" as illustrated). If an individual pixel region includes two distinct values, a pixel region value may be set to a bit value indicating the pixel region has two distinct value (e.g., "2" as illustrated). If an individual pixel region includes three or more distinct values, the pixel region may be set to a value indicating the pixel region has three or more distinct values (e.g., "0" as illustrated). In general, any pixel region value(s) or bit value(s) or the like may be used to indicate whether a pixel region has a single distinct value, two distinct values, or three or more distinct values, as described.

In general, the techniques described with respect to FIGS. 2 and 5 may provide for pixel region values indicating whether a pixel region has a single distinct value, two distinct values, or three or more distinct values. In cases where a pixel region has a single distinct value, only the single distinct value may be retained for the pixel region as described with respect to FIG. 4 above and as discussed further below. Further, in cases where a pixel region has three or more distinct values, all of the values for the pixel region (e.g. four values in the illustrated example of pixel regions of 2×2 pixels) may be retained as described with respect to FIG. 4 above and as discussed further below. In cases where a pixel region has two distinct values, only the two distinct values may be retained for the pixel region, but an additional indicator must be provided to indicate which of the two distinct values is associated with the individual pixels, as is discussed below.

Figure 6:
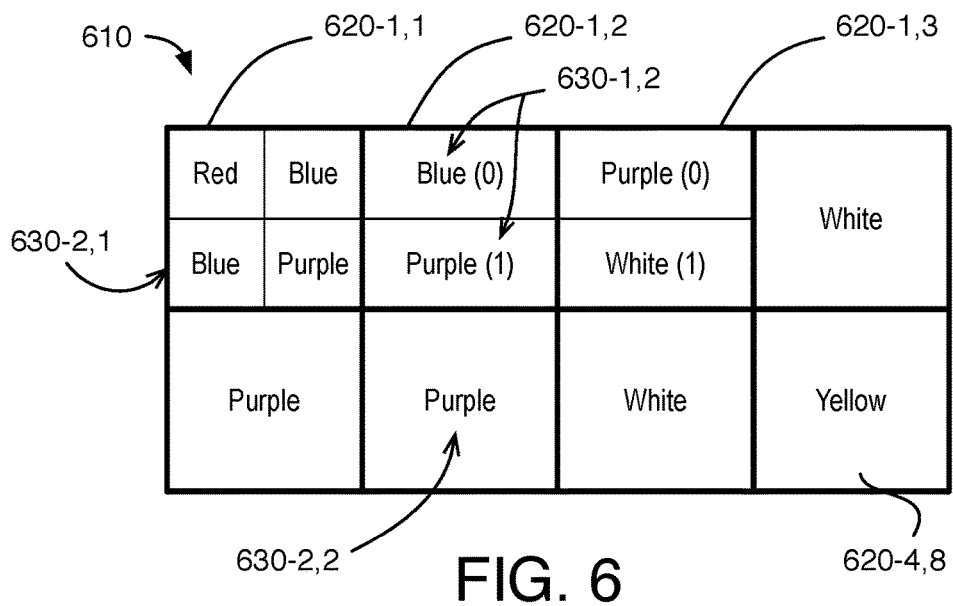
FIG. 6 is an illustrative diagram of an example tile of pixel regions having some pixel regions with a single distinct value, some pixel regions with two distinct values, and other pixel regions with three or more distinct values.

FIG. 6 is an illustrative diagram of an example tile 610 of pixel regions 620 having some pixel regions 620 with a single distinct value, some pixel regions 620 with two distinct values, and other pixel regions 620 with three or more distinct values, arranged in accordance with at least some implementations of the present disclosure. For example, as shown in FIG. 6, some pixel values may be eliminated or discarded as repetitive. In general, values 630 may be considered retained pixel values 630, or the like. As shown with respect to pixel region 620-2,2, a single distinct value 630-2,2 (e.g., "Purple") may be retained for pixel region 620-2,2.

Further, as shown with respect to pixel region 620-1,1, for a pixel region having three or more distinct values, all of the values may be retained. For example, pixel region 620-1,1, includes three distinct values and each of values 630-1,1 ("Red"), 630-1,2 ("Blue"), 630-2,1 ("Blue"), and 630-2,2 ("Purple"), may be retained. As discussed, in general, for an individual pixel region having three or more distinct values, all of the values may be retained and, in such pixel regions, substantially no compression may have been attained, for example.

Also as shown in FIG. 6, for pixel regions having two distinct values (e.g., pixel regions 620-1,2 and 620-1,3), the two distinct values may be retained. For example, for pixel region 620-1,2, pixel value 630-1,2(1) ("Blue") and pixel value 630-1,2(2) ("Purple") may be retained. As discussed, such reduction in values may provide compression to meet a bit budget as described herein. Further, a pixel indicator value may be used to indicate, for each individual pixel in pixel region 620-1,2, the pixel value associated with the individual pixel.

Figure 7:
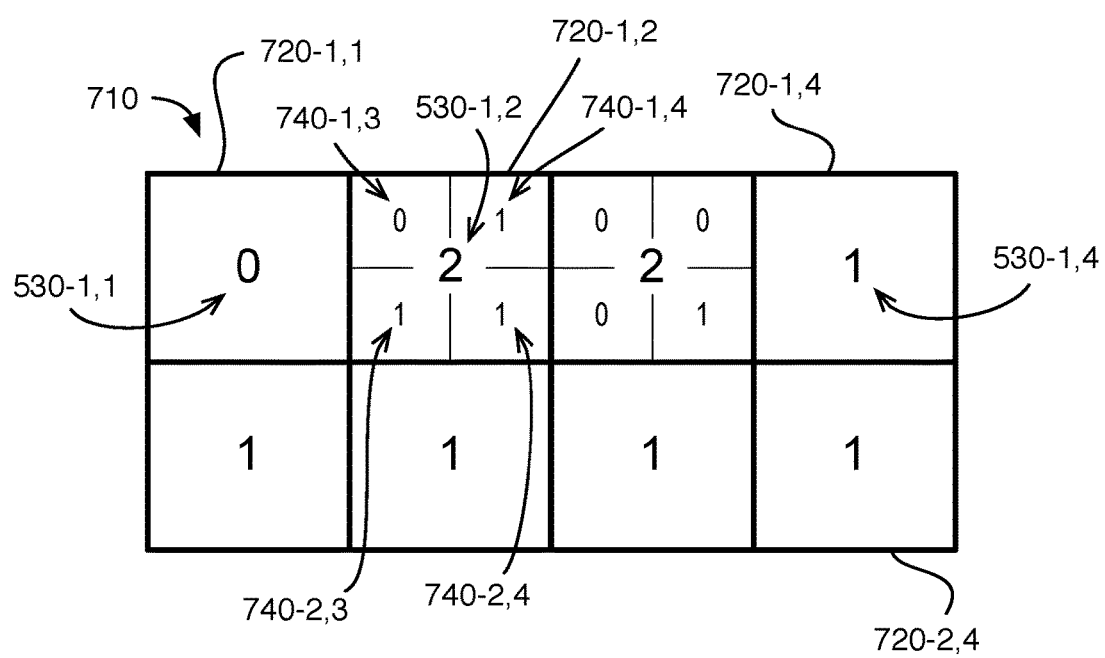
FIG. 7 is an illustrative diagram of an example tile of pixel regions having pixel region values and/or associated pixel indicator values.

FIG. 7 is an illustrative diagram of an example tile 710 of pixel regions 720 having pixel region values 730 and/or associated pixel indicator values 740, arranged in accordance with at least some implementations of the present disclosure. As shown in FIG. 7, for pixel regions having a single distinct value (e.g., pixel regions 720-1,4, 720-2,1, 720-2,2, 720-2,3, and 720-2,4) and pixel regions having three or more distinct values (e.g., pixel region 720-1,1) only a pixel region value may be used to indicate the values of the pixel region. For example, for pixel region 720-1,4, pixel region value 730-1,4 (e.g., a value of "1") may indicate pixel region 720-1,4 has a single distinct value (i.e., "White"; please refer to FIG. 6). Also as an example, for pixel region 720-1,1 pixel region value 730-1,1 (e.g., a value of "0") may indicate pixel region 720-1,1 has three or more distinct values (i.e., "Red", "Blue", and "Purple"; please refer to FIG. 6).

As also shown in FIG. 7, for pixel regions having two distinct values (e.g., pixel regions 720-1,2 and 720-1,3), a pixel region value may be given for the pixel region and a pixel indicator value may be given for each pixel in the pixel region. For example, for pixel region 720-1,2 pixel region value 530-1,2 (e.g., a value of "2") may indicate pixel region 720-1,2 has two distinct values (i.e., "Blue" and "Purple"; please refer to FIG. 6). Further, pixel indicator values 740 may indicate which of the two distinct values each of the individual pixels is associated with. For example, for pixel indicator value 740-1,3, a value of "0" may indicate pixel 240-1,3 has an associated value of "Blue" (please see FIGS. 2 and 6), pixel indicator value 740-2,3 having a value of "1" may indicate pixel 240-2,3 has a value of "Purple", and so on. In some examples, values of "0" and "1" may be used for pixel indicator values 740; however any suitable values may be used.

As discussed, in storing or saving graphics data associated with a tile, eliminating repetitive pixel values may save memory, memory bandwidth transactions, or the like and may improve system performance. For example, such compression techniques may meet a bit budget as described herein. Also as discussed, in some examples, the graphics data may be further compressed using standard codecs to meet a bit budget or a more stringent bit budget, or the like. In particular, standard techniques for saving or storing (or passing along to a codec) graphics data associated with a tile may provide a value for each pixel 220 (please refer to FIG. 2), repeating a substantial number of pixel values 230 in some implementations. In contrast, graphics data associated with tile 710 may be substantially compressed using the techniques described herein without loss of information.

Turning again now to FIG. 10, FIG. 10 is an illustrative diagram of example graphics data 1000, arranged in accordance with at least some implementations of the present disclosure. As shown in FIG. 10 and discussed, graphics data 1000 may include header portion 1002 and/or data portion 1004. As discussed, header portion 1002 may include one or more indicators 1008 such as indicator 1008, which may indicate whether data portion 1004 is compressed according to the techniques described herein. As shown, data portion 1004 may include pixel region values 1020, pixel indicator values 1030, and/or subset of pixel values 1040. In some examples, pixel region values 1020 may include pixel region values 330 or 530. In some examples, pixel indicator values 1030 may include pixel indicator values 740. In some examples, subset of pixel values 1040 may include retained pixel values 630 such that a portion of pixel values 230 are not contained in graphics data 1000 as discussed. As described herein, graphics data 1000 may be stored in memory or retrieved from memory and decompressed. As also discussed herein, data portion 1004 of graphics data 1000 may be stored in memory in a further compressed form based on a compression using a standard codec or the like.

As will be discussed in greater detail below, a system, such as a computer-implemented system may be used to perform some or all of the various operations discussed herein in connection with the FIGS. 1-7.

FIG. 8 is a flow chart illustrating an example process 800, arranged in accordance with at least some implementations of the present disclosure. In general, process 800 may provide a computer-implemented method for providing compression in graphics rendering. In the illustrated implementation, process 800 may include one or more operations, functions or actions as illustrated by one or more of blocks 802, 804, 806, 808 and/or 810. By way of non-limiting example, process 800 will be described herein with reference to operations discussed with respect to FIGS. 1-7 above and example system 100 discussed below.

Process 800 may be utilized as a computer-implemented method for providing compression in graphics rendering. Process 800 may begin at block 802, "Determine Values associated with Individual Pixels of a Tile of Pixels", where a plurality of values associated with individual pixels of a tile of pixels may be determined. For example, values v1-v32 of tile 110 or values 230 of tile 210 may be determined. In general, the values may be determined by any suitable technique such as, for example, various rendering techniques. In some examples, the rendering may include applying at least one of a super-sampling anti-aliasing technique, a multi-sampling anti-aliasing technique, or the like. In other examples, determining the plurality of values may include accessing graphics data (e.g., via a cache or buffer or the like) associated with the tile of pixels. For example, the graphics data may include the plurality of values. Such accessing of graphics data may occur on a cache evict for example.

Processing may continue from operation 802 to operation 804, "Determine Pixel Regions of the Tile of Pixels", where a plurality of pixel regions may be determined based on the tile of pixels. In some examples, pixel regions 240 or the like may be determined based on tile 210 of pixels 220. Each pixel region may include a corresponding subset of the individual pixels. For example, pixel region 240-1,1 may include a corresponding subset of pixels including pixels 220-1,1, 220-1,2, 220-2,1, and 220-2,2 of pixels 220 (please refer to FIG. 2), and so on. In some examples, a tile of pixels may be divided into pixel regions such that each pixel of the tile is in one and only one pixel region.

Processing may continue from operation 804 to operation 806, "Determine an Individual Pixel Region has Pixel Values having a Single Distinct Value", where it may be determined that, for an individual pixel region of the plurality of pixel regions, the subset of values associated with the subset of individual pixels corresponding to the individual pixel region includes a single distinct value. For example, for pixel region 240-2,1, it may determined that the subset of values 230-3,1, 230-3,2, 230-4,1, and 230-4,2 associated with subset of individual pixels 220-3,1, 220-3,2, 220-4,1, and 220-4,2 may include a single distinct value (e.g., "Purple"), as shown in FIG. 2.

Processing may continue from operation 806 to operation 808, "Set a Pixel Region Value for the Individual Pixel Region Indicating the Pixel Region has a Single Distinct Value", where a pixel region value may be set for the individual pixel region to a bit value indicating the individual pixel region comprises the single distinct value. For example, pixel region value 330-2,1 or pixel region value 530-2,1 may be set to a bit value of "1" or the like to indicate pixel region 240-2,1 includes a single distinct value (please refer to FIGS. 3 and 5).

Processing may continue from operation 808 to operation 810, "Store Graphics Data Including the Pixel Region Value and the Single Distinct Value", where graphics data including the pixel region value and the single distinct value associated with the individual pixel region may be stored. For example, the graphics data may be stored in a memory. For example, pixel region values 330 or 530 and/or retained values 430 and/or 630 may be stored. In some examples the graphics data may include graphics data 1000. As discussed, in some examples, the graphics data may be stored in compressed format only if it meets a bit budget. In such examples, the number of bits for the graphics data may be compared with the bit budget. If the number of bits for the graphics data is less than the bit budget, the graphics data may be stored. If the number of bits for the graphics data is greater than the bit budget, other graphics data including the plurality of values associated with individual pixels of a tile of pixels may be stored.

As shown in FIG. 8, in some examples, blocks 802-808 may be performed serially. However, as discussed herein, in general, the operations of FIG. 8 may be performed in an order other than as shown and some operations may be skipped entirely. Further, as described, the operations of FIG. 8 may be associated with operations described with respect to FIGS. 3 and 4 or operations described with respect to FIGS. 5-7.

For example, FIG. 8 describes operations performed with respect to FIGS. 3 and 4 in cases where a pixel region may be compressed to a single distinct value. As discussed, in cases where a pixel region may not be compressed, all of the associated pixel values may be retained and stored as a portion of graphics data 1000. For example, it may be determined, for an individual pixel region of the plurality of pixel regions, that the subset of values associated with the individual pixels in the individual pixel region includes two or more distinct values. For example, for pixel region 240-1,1 the subset of values 230-1,1, 230-1,2, 230-2,1, and 230-2,2 associated with the pixels 220-1,1, 220-1,2, 220-2,1, and 220-2,2 in pixel region 240-1,1 include three distinct value (e.g., "Red", "Blue", and "Purple"). In such examples, a pixel region value may be set for the individual pixel region to a bit value indicating the individual pixel region has the three or more distinct values. For example, pixel region value 330-1,1 may be set to a value of "0". Further graphics data 1000 may include pixel region value 330-1,1 and the two or more distinct values (e.g., "Red", "Blue", and "Purple") corresponding to individual pixel region 240-1,1. In some examples, the two or more distinct values may include three or four or more distinct values.

Figure 9:
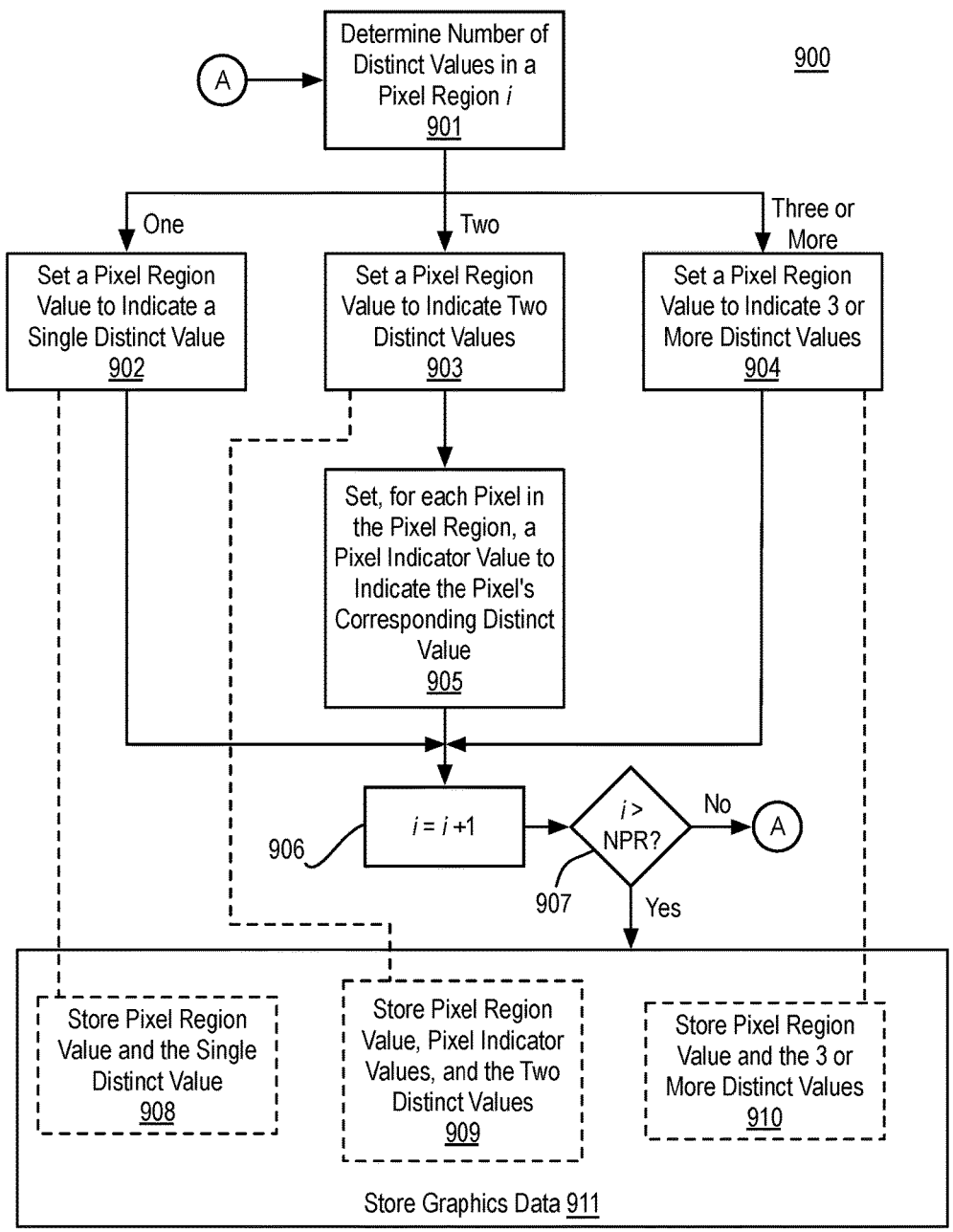
FIG. 9 is a flow chart illustrating an example process.

In other examples, the operations of FIG. 8 may be associated with operations described with respect to FIGS. 5-7 as is discussed further with respect to FIG. 9. FIG. 9 is a flow chart illustrating an example process, arranged in accordance with at least some implementations of the present disclosure. In general, process 900 may provide a computer-implemented method for providing compression in graphics rendering. In the illustrated implementation, process 900 may include one or more operations, functions or actions as illustrated by one or more of blocks 901, 902,

903, 904, 905, 906, 907, 908, 909, 910 and/or 911. By way of non-limiting example, process 900 will be described herein with reference to operations discussed with respect to FIGS. 2 and 5-7 above and example system 100 discussed below.

Process 900 may be utilized as a computer-implemented method for providing compression in graphics rendering. Process 900 may begin at operations (not shown) to determine values associated with individual pixels of a tile of pixels, where a plurality of values associated with individual pixels of a tile of pixels may be determined, and to determine pixel regions of the tile of pixels, where a plurality of pixel regions may be determined based on the tile of pixels, as discussed herein. For example, values v1-v32 of tile 110 or values 230 of tile 210 may be determined and pixel regions 240 or the like may be determined based on tile 210 of pixels 220, for example.

Processing may continue at operation 901, "Determine Number of Distinct Values in a Pixel Region i", where a number of distinct values in a pixel region i may be determined. For example, within a pixel region, pixel values may be compared to determined a number of distinct values. For example, for an individual pixel region of pixel regions 240 such as pixel region 240-1-1, pixel values 230-1,1, 230-1,2, 230-2,1, and 230-2,2 may be compared to determine a number of distinct values in pixel region 240-1,1. As discussed herein, in various examples, a pixel region may have a single distinct value, two distinct values, or three or more distinct values, or the like. In general, at a first iteration at operation 901, a first pixel region may be evaluated and, at subsequent iterations, subsequent pixel regions may be evaluated until each of the individual pixel regions are evaluated, as is described further below. In general, i, may be a counter variable that may count from 1 to T, where T is the total number of pixel regions (e.g., 8 in the illustrated examples).

Depending on the number of distinct values in the pixel region, processing may continue at operation 902, 903, or 904. As shown, if the pixel region has one distinct value, processing may continue at block 902, "Set a Pixel Region Value to Indicate a Single Distinct Value", where a pixel region value may be set for the individual pixel region to a bit value indicating the individual pixel region comprises the single distinct value. For example, pixel region value 530-2,1 may be set to a bit value of "1" or the like to indicate pixel region 240-2,1 includes a single distinct value (please refer to FIG. 5).

If the pixel region has two distinct values, processing may continue at block 903, "Set a Pixel Region Value to Indicate Two Distinct Values", where a pixel region value may be set for the individual pixel region to a bit value indicating the individual pixel region comprises two distinct values. For example, pixel region value 530-1,2 may be set to a bit value of "2" or the like to indicate pixel region 240-1,2 includes two distinct value (please refer to FIG. 5).

From operation 903, processing may continue at operation 905, "Set, for each Pixel in the Pixel Region, a Pixel Value to Indicate the Pixel's Corresponding Distinct Value", where pixel indicator values may be set for individual pixels in the pixel region having two distinct values to indicate the distinct value (i.e., which of the two distinct values) associated with the individual pixel. For example, pixel indicator value 740-1,3 may be set to "0" to indicate pixel 720-1,3 is associated with a pixel value 730-1,3 of "Blue" and pixel indicator value 740-1,4 may be set to "1" to indicate pixel 720-1,4 is associated with a pixel value 730-1,1 of "Purple", and so on.

If the pixel region has three or more distinct values, processing may continue at block 904, "Set a Pixel Region Value to Indicate 3 or More Distinct Values", where a pixel region value may be set for the individual pixel region to a bit value indicating the individual pixel region comprises three or more distinct values. For example, pixel region value 530-1,1 may be set to a bit value of "0" or the like to indicate pixel region 240-1,1 includes three or more distinct values (please refer to FIG. 5).

Processing may continue at operation 906 from any of operations 902, 905, or 904 as illustrated. At operation 906, "i=i+1", where counter variable i may be increased by one. For example, increasing i by one may move from one pixel region to the next for process 900.

Process may continue from operation 906 to operation 907, "i>NPR?", where it may be determined whether i is greater than the number of pixel region such that NPR may be the number of pixel regions. That is, if i is greater than the number of pixel regions, the previous iteration may have been for the last pixel region, and process 900 may continue at operation 911. If i is not greater than the number of pixel regions, process 900 may continue at operation 901 for another iteration as described above.

At operation 911, "Store Graphics Data", graphics data generated via the described iterations may be stored. For example, the graphics data may be stored in memory or the like. As shown, storing the graphics data may include operations 908, 909, and/or 910 depending on the results of the described iterations. As shown at operation 908, "Store Pixel Region Value and the Single Distinct Value", storing the graphics data may include storing a pixel region value indicating a pixel region has a single distinct value and storing the single distinct value. Such operations may occur for pixel regions having a single distinct value, as discussed. Similarly, as shown at operation 909, "Store Pixel Region Value, Pixel Indicator Values, and the Two Distinct Values", storing the graphics data may include storing a pixel region value indicating a pixel regions has two distinct values, storing pixel indicator values indicating which of two distinct values are associated with individual pixels in the pixel region, and the two distinct values. Such operations may occur for pixel regions having two distinct values, as discussed. Further, as shown at operation 910, "Store Pixel Region Value and the 3 or More Distinct Values", storing the graphics data may include storing a pixel region value indicating a pixel region has three or more distinct values and storing the three or more distinct values. Such operations may occur for pixel regions having three or more distinct values, as discussed. In some examples, pixel regions having three or more distinct values may be considered a default and no pixel region value may be stored in such examples.

In general, process 800 and/or 900 may provide for compression in graphics rendering as discussed herein. Process 800 and/or process 900 may be repeated any number of times either in serial or in parallel, as needed. Furthermore, in general, process 800 and/or process 900 may be implemented via hardware, software, firmware, or a combination thereof, as is discussed further herein.

Figure 11:
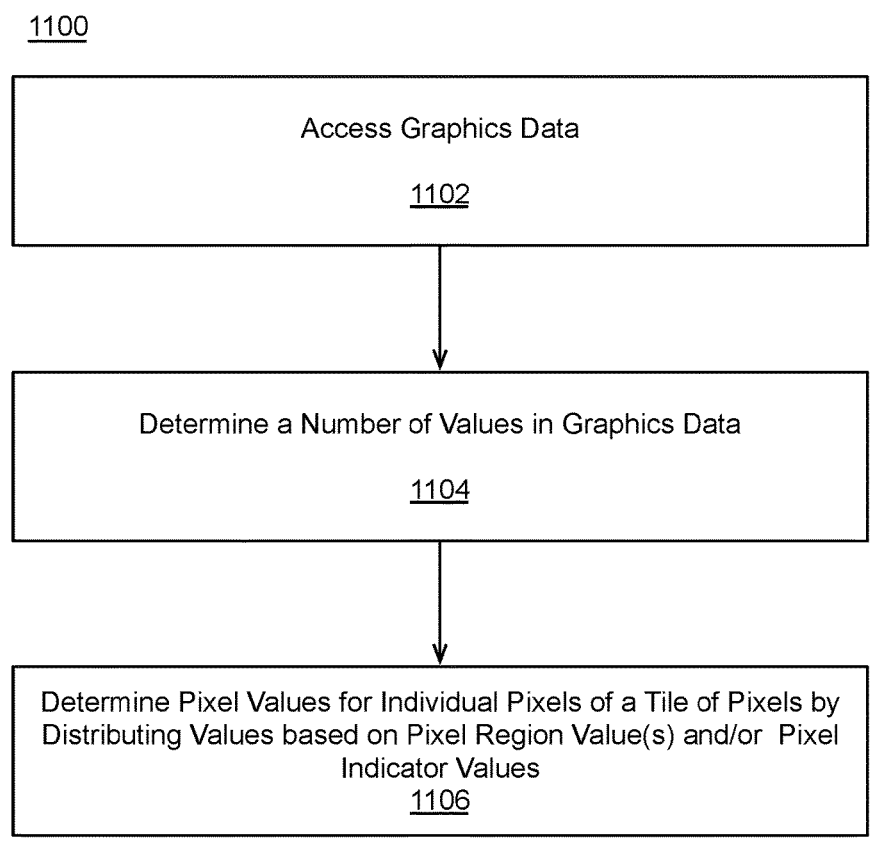
FIG. 11 is a flow chart illustrating an example process.

FIG. 11 is a flow chart illustrating an example process 1100, arranged in accordance with at least some implementations of the present disclosure. In general, process 1100 may provide a computer-implemented method for providing decompression in graphics rendering. In the illustrated implementation, process 1100 may include one or more operations, functions or actions as illustrated by one or more of blocks 1102, 1104, and/or 1106. By way of non-limiting example, process 1100 will be described herein with reference to operations discussed with respect to FIGS. 1-10 above and example system 100 discussed below.

Process 1100 may be utilized as a computer-implemented method for providing decompression in graphics rendering. Process 1100 may begin at block 1102, "Access Graphics Data" where graphics data may be accessed. For example, the graphics data may include pixel region values, pixel indicator values, and/or pixel values as described herein. For example, the graphics data may be accessed via memory. In some examples, the graphics data may include pixel region values 330 and retained values 430 as discussed with respect to FIGS. 3 and 4 and elsewhere herein. In some examples, the graphics data may include pixel region values 530, pixel indicator values 740, and retained values 630 as discussed with respect to FIGS. 5-7 and elsewhere herein. In some examples the graphics data may include graphics data 1000.

Processing may continue from operation 1102 to operation 1104, "Determine a Number of Values in Graphics Data" where a number of values may be determined based on the accessed graphics data. For example, the number of values may include the number of retained values 430 or the number of retained values 630 or the like.

Processing may continue from operation 1104 to operation 1106, "Determine Pixel Values for Individual Pixels of a Tile of Pixels by Distributing Values based on Pixel Region Value(s) and/or Pixel Indicator Values" where a plurality of values associated with individual pixels of a tile of pixels may be determined based at least in part on the accessed graphics data. For example, pixel values 230 may be determined for pixels 220 of tile 210. Determining the pixel values may be based on the accessed graphics data and reversing the described compression steps. For example, for a pixel region having a single distinct value, the single distinct value may be distributed to each pixel in the corresponding pixel region. For example, for pixel region 320-2,1, a value of "Purple" may be distributed to each pixel in pixel region 240-2,1 (e.g., pixels 220-3,1, 220-3,2, 220-4,1, and 220-4,2). Similarly, in examples, where no pixel indicator values are implemented (for example, as discussed with respect to FIGS. 3 and 4), for pixel regions having two or more distinct values, the pixel values may be read from the graphics data for the associated pixel.

If pixel indicator values are implemented, for pixel regions having two distinct values, the two distinct values may be distributed to each pixel in the corresponding pixel region. In some examples, a default may be set such that the first pixel (in order) in the pixel region is associated with the first value and no indicator may need to be accessed for the first pixel, for example. For the remaining pixels in the pixel region, a pixel indicator value may be accessed and the associated value may be distributed to the pixel. For example, for pixel region 720-1,2, at pixel 220-1,3 a value of "Blue" may be distributed since pixel 220-1,3 is first in order and "Blue" may be associated with a pixel indicator values of "0". For the remaining pixels, pixel indicator values 720-1,2, 720-1,2, and 720-1,2, may be accessed to distribute "Blue" (if the pixel indicator value is "0") or "Purple" (if the pixel indicator value is "1"). Further, in such examples where pixel indicator values are implemented, if a pixel region has three or more distinct values, the pixel values may be read from the graphics data for the associated pixel.

In general, process 1100 may provide for decompression in graphics rendering as discussed herein. Process 1100 may be repeated any number of times either in serial or in parallel, as needed. Furthermore, in general, process 1100 may be implemented via hardware, software, firmware, or a combination thereof, as is discussed further herein. As discussed, standard compression techniques may be used on the remaining values after the techniques discussed herein have been used. Therefore, standard decompression technique corresponding to the standard compression techniques may be applied before decompression technique discussed herein may be used.

In general, the techniques discussed herein may provide for substantial data compression. For example, in the context of color compression, the success rate of tile compressing (i.e., whether the compression successfully meets a bit budget as discussed herein), may be substantially improved over prior methods. Standard color compression techniques may achieve a 50% compression bit budget success rate in the range of about 20% to 40% for various tiles, for example. Using the techniques discussed herein without pixel indicator values, 50% compression bit budget success rate in the range of about 80% to 95% or more for various tiles may be achieved. Using the techniques discussed herein with pixel indicator values (e.g., quad palette techniques as discussed), 50% compression bit budget success rate in the range of about 85% to 100% for various tiles may be achieved.

Furthermore, the techniques discussed herein may be generalized to a pixel region of N×N pixels having C compressible colors, which may require $\log_2 C$ bits per pixel to encode. In general, two bit pixel region values may still be used to indicate whether a pixel region comprises a single distinct value, C or fewer compressible colors, or more than C colors. In such a generalized example, the pixel region values may include a first value to indicate the region includes a single distinct value, a second value to indicate the region includes C or fewer colors, which may be compressed using $\log_2 C$ bits per pixel, or a third value to indicate the region includes more than C colors, in which case all of the C colors are stored.

Some additional and/or alternative details related to process 800, 900 or 1100 may be illustrated in one or more examples of implementations discussed in greater detail below with regard to FIG. 12.

Figure 12:
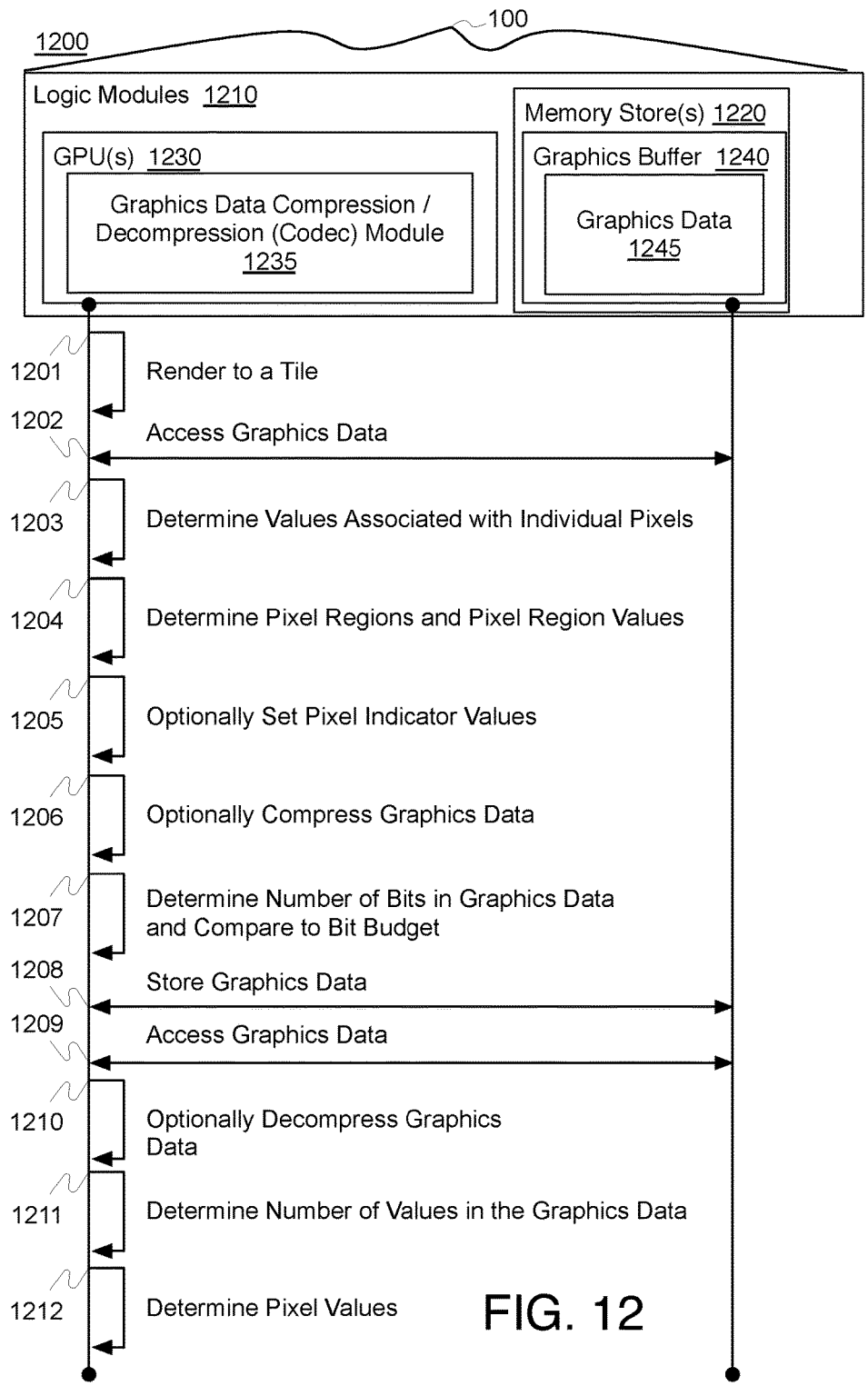
FIG. 12 is an illustrative diagram of example system and process for providing compression and/or decompression in graphics rendering.

FIG. 12 is an illustrative diagram of example system 100 and process 1200 for providing compression and/or decompression in graphics rendering, arranged in accordance with at least some implementations of the present disclosure. In the illustrated implementation, process 1200 may include one or more operations, functions or actions as illustrated by one or more of actions 1201, 1202, 1203, 1204, 1205, 1206, 1207, 1208, 1209, 1210, 1211, and/or 1212. By way of non-limiting example, process 900 also will be described herein with reference to example video coding system 100 of FIG. 13, as is described herein below.

In the illustrated implementation, system 100 may include logic modules 1210, the like, and/or combinations thereof. For example, modules 1210, may include memory store(s) 1220, graphics processing unit(s) 1230, which may include graphics data compression/decompression ("codec") module 1235, and graphics buffer 1240, the like, and/or combinations thereof. In various examples, graphics data codec module 1235 may provide compression or decompression or both.

Graphics data codec module 1235, for example, may be configured to determine a plurality of values associated with individual pixels of a tile of pixels, determine, based at least in part on the tile of pixels, a plurality of pixel regions such that each pixel region includes a corresponding subset of the individual pixels, determine, for an individual pixel region of the plurality of pixel regions, the subset of values associated with the subset of individual pixels corresponding to the individual pixel region has a single distinct value, set a pixel region value for the individual pixel region to a bit value indicating the individual pixel region has the single distinct value, and store, in graphics buffer 1240, graphics data 1245 including the pixel region value and the single distinct value associated with the individual pixel region. In such a manner, graphics data codec module 1235 may provide compression for graphics data such as values associated with pixels of a tile of pixels, for example.

Graphics data codec module 1235 (or another module of graphics processing unit(s) 1230) may be further configured to access graphics data 1245, determine a number of values in graphics data 1245 based at least in part on graphics data 1245, and determine a plurality of values associated with individual pixels of a tile of pixels based at least in part on graphics data 1245. For example, the determination of the plurality of values associated with individual pixels of the tile of pixels may include distributing a single distinct value to each pixel of an individual pixel region based at least in part on a pixel region value indicating the single distinct value corresponds to each pixel, distributing a first value of two distinct values to an individual pixel in a pixel region based at least in part on a pixel region value indicating the pixel region has two distinct values and an individual pixel indicator value, and/or distributing three or more distinct values to pixels of a pixel region having a pixel region value indicating the pixel region has three or more distinct values. In such a manner, graphics data codec module 1235 (or another module of graphics processing unit(s) 1230) may provide decompression for graphics data such as values associated with pixels of a tile of pixels, for example. As discussed, in some examples, graphics data codec module 1235 may be configured to provide both compression and decompression. In other examples, compression and decompression may be provided by separate modules (e.g., compression module(s) and decompression module(s)).

Process 1200 may be utilized as a computer-implemented method for providing compression and/or decompression in graphics rendering. Process 1200 may begin at block 1201, "Render to a Tile", where a tile of pixels may be rendered. The tile may be rendered using any suitable techniques and may generate a tile of pixels as discussed herein. The rendering may be based on any suitable data such as image data, model, models, or model data, scene data, vector data, raster data, or the like.

Processing may continue from operation 1201 to operation 1202, "Access Graphics Data", where graphics data codec module 1235 may access graphics data 1245 via graphics buffer 1240 of memory stores 1220. Graphics data 1245 may contain any data as discussed herein (either further compressed or without further compressed). In some examples, the graphics data may include pixel values such as, for example, pixel values 230.

Processing may continue from operation 1202 to operation 1203, "Determine Values Associated with Individual Pixels", where a plurality of values associated with individual pixels of a tile of pixels may be determined. For example, values v1-v32 of tile 110 or values 230 of tile 210 may be determined. As shown, in some examples, determining the plurality of values may include accessing graphics data 945 via graphics buffer 940. For example, graphics data 945 may include the plurality of values. Such accessing of graphics data may occur on a cache evict for example.

Processing may continue from operation 1203 to operation 1204, "Determine Pixel Regions and Pixel Region Values", where a plurality of pixel regions may be determined based on the tile of pixels and where pixel region values may be determined for the pixel regions. In some examples, pixel regions 240 or the like may be determined based on tile 210 of pixels 220. As described, each pixel region may include a corresponding subset of the individual pixels. For example, pixel region 240-1,1 may include a corresponding subset of pixels including pixels 220-1,1, 220-1,2, 220-2,1, and 220-2,2 of pixels 220 (please refer to FIG. 2), and so on. In some examples, a tile of pixels may be divided into pixel regions such that each pixel of the tile is in one and only one pixel region. Further, pixel region values may be determined and or set for the pixel regions as described herein. For example, pixel region values 330 or pixel region values 530 may be determined and/or set in various embodiments.

Processing may continue from operation 1204 to operation 1205, "Optionally Set Pixel Indicator Values", where, in some embodiments, pixel indicator value(s) may be set. As discussed, in some examples, pixel indicator values may not be used and, if a pixel region has two or more distinct values, all of the distinct values for the pixel region may be retained. Such examples have been discussed with respect to FIGS. 3 and 4, for example. In other examples, pixel indicator values may be used for additional compression. For example, in examples where pixel indicator values are used, in pixel regions having two distinct values, pixel indicator values may be set for individual pixels in the pixel region to indicate the distinct value (i.e., which of the two distinct values) associated with the individual pixel. For example, pixel indicator value 740-1,3 may be set to "0" to indicate pixel 720-1,3 is associated with a pixel value 730-1,3 of "Blue" and pixel indicator value 740-1,4 may be set to "1" to indicate pixel 720-1,4 is associated with a pixel value 730-1,1 of "Purple", and so on.

Processing may continue from operation 1205 to operation 1206, "Optionally Compress Graphics Data", where prior to storing the graphics data, at least one of the subset of plurality of values or the plurality of pixel index values may be compressed. As discussed in some examples, further compression of the graphics data may allow the data to reach a bit budget or the like.

Processing may continue from operation 1206 to operation 1207, "Determine Number of Bits in Graphics Data and Compare to Bit Budget", where a number of bits for the graphics data may be determined and a bit budget may be determined. For example, the number of bits may be determined by adding bit contributions from the pixel region values, pixel indicator values (if used), and retained values, as discussed. In general, if the graphics data are less than the desired bit budget (either with or without the further compression discussed at operation 1206), the compression may have succeeded. In such examples, the graphics data compressed as discussed herein and optionally further compressed may be stored in memory. In general, if the bit budget is not met, the compression may have failed and the individual pixel values may be stored uncompressed using standard techniques.

Processing may continue from operation 1207 to operation 1208, "Store Graphics Data", where graphics data comprising pixel region values, pixel indicator values (if used), and retained values, as discussed may be stored. For example, graphics data 1245 may be stored in graphics buffer 1240 implemented via memory stores 1220. In some examples, pixel region values 330 and retained values 430 may be stored. In some examples, pixel region values 530, pixel indicator values 740, and retained values 630 may be stored. In some examples graphics data 1245 may include graphics data 1000.

In general, operations 1201-1208 may provide graphics data compression. Such compression may occur when storing graphics data into graphics buffer 1240, on a cache evict of graphics buffer 1240, or the like.

As follows, operations 1209-1212 may provide graphics data compression. For example, processing may continue from operation 1208 to operation 1209, "Access Graphics Data", where graphics data may be accessed. In some examples, as discussed, graphics data 1245 may include pixel region values 330 and retained values 430. In some examples, as discussed, graphics data 1245 may include pixel region values 530, pixel indicator values 740, and retained values 630. Also as discussed, in some examples graphics data 1245 may include graphics data 1000.

Processing may continue from operation 1209 to operation 1210, "Optionally Decompress Graphics Data", where the graphics data may be decompressed in some examples. For example, the graphics data may include data that was further compressed using a standard codec to meet a bit budget. In such examples, the further compressed graphics data may be decompressed using a standard codec prior to the processing discussed herein. In general, operation 1210 may be skipped in implementations where the graphics data was not further compressed. In such implementations, processing may continue from operation 1209 to 1211.

In either case, processing may continue at operation 1211, "Determine Number of Values in the Graphics Data", where a number of values may be determined based on the accessed graphics data. For example, the number of values may include the number of retained values 430 or the number of retained values 630 or the like.

Processing may continue from operation 1211 to operation 1212, "Determine Pixel Values", where a plurality of values associated with individual pixels of a tile of pixels may be determined based at least in part on the accessed graphics data. For example, pixel values 230 may be determined for pixels 220 of tile 210. Determining the pixel values may be based on the accessed graphics data and reversing the described compression steps. For example, for a pixel region having a single distinct value, the single distinct value may be distributed to each pixel in the corresponding pixel region. For example, for pixel region 320-2,1, a value of "Purple" may be distributed to each pixel in pixel region 240-2,1 (e.g., pixels 220-3,1, 220-3,2, 220-4,1, and 220-4,2) Similarly, in examples, where no pixel indicator values are implemented (for example, as discussed with respect to FIGS. 3 and 4), for pixel regions having two or more distinct values, the pixel values may be read from the graphics data for the associated pixel.

If pixel indicator values are implemented, for pixel regions having two distinct values, the two distinct values may be distributed to each pixel in the corresponding pixel region. In some examples, a default may be set such that the first pixel (in order) in the pixel region is associated with the first value and no indicator may need to be accessed for the first pixel, for example. For the remaining pixels in the pixel region, a pixel indicator value may be accessed and the associated value may be distributed to the pixel. For example, for pixel region 720-1,2, at pixel 220-1,3 a value of "Blue" may be distributed since pixel 220-1,3 is first in order and "Blue" may be associated with a pixel indicator values of "0". For the remaining pixels, pixel indicator values 720-1,2, 720-1,2, and 720-1,2, may be accessed to distribute "Blue" (if the pixel indicator value is "0") or "Purple" (if the pixel indicator value is "1"). Further, in such examples where pixel indicator values are implemented, if a pixel region has three or more distinct values, the pixel values may be read from the graphics data for the associated pixel.

In general, operations 1209-1212 may provide graphics data decompression. Such decompression may occur when using or preparing to use graphics data 1245. For example, such decompressed graphics data may be used for rendering a tile, displaying an image, or the like.

In general, process 1200 may be repeated any number of times either in serial or in parallel, as needed. Furthermore, in general, graphics data codec module 1235 may be implemented via hardware, software, and/or firmware. As shown, in some implementations, graphics data codec module 1235 may be implemented via graphics processing unit(s) 1230. In other implementations, graphics data codec module 1235 may be implemented via software implemented via one or more central processing unit(s). In general, graphics data codec module 1235 and/or the operations discussed herein may be enabled or enabled at a system or user level, for example.

While implementation of example processes 800, 900, 1100, 1200 and other processes discussed herein may include the undertaking of all blocks or operations shown in the order illustrated, the present disclosure is not limited in this regard and, in various examples, implementation of the processes discussed herein may include the undertaking only a subset of the blocks shown and/or in a different order than illustrated.

In addition, any one or more of the blocks or operations discussed herein (such as the operations illustrated and discussed with respect to FIGS. 1-12) may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks or operations discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
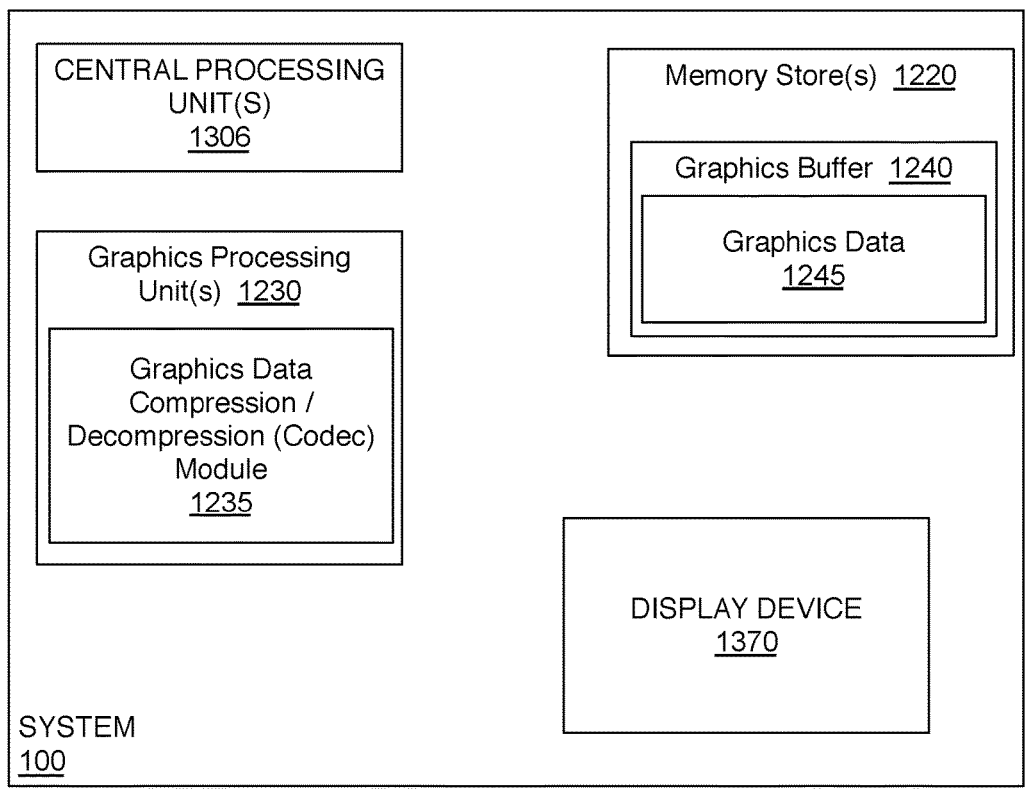
FIG. 13 is an illustrative diagram of an example system for compression and/or decompression providing graphics rendering.

FIG. 13 is an illustrative diagram of an example system 100 for providing compression is graphics rendering, arranged in accordance with at least some implementations of the present disclosure. In the illustrated implementation, system 100 may include one or more central processing units 1306, one or more memory stores 1220, one or more graphics processing units 1230, graphics buffer 1240 and/or a display device 1370. Central processing units 1306, memory store 1220, graphics processing units 1230, buffer 1240, and/or display device 1370 may be capable of communication with one another, via, for example, a bus or other access. In various implementations, display device 1370 may be integrated in system 100 or implemented separately from system 100.

As shown in FIG. 13, and discussed above, graphics data codec module 1235 may be implemented via graphics processing units 1230. In other example, graphics data codec module 1235 may be implemented via central processing units 1306. As shown, graphics processing unit 1230 may include graphics data codec module 1235. Graphics processing unit 1230 may be communicatively coupled to graphics buffer 1240. Graphics data codec module 1235 may be configured to determine a plurality of values associated with individual pixels of a tile of pixels, determine, based at least in part on the tile of pixels, a plurality of pixel regions such that each pixel region comprises a corresponding subset of the individual pixels, determine, for an individual pixel region of the plurality of pixel regions, the subset of values associated with the subset of individual pixels corresponding to the individual pixel region includes a single distinct value, set a pixel region value for the individual pixel region to a bit value indicating the individual pixel region comprises the single distinct value, and store, in graphics buffer 1240, graphics data 1245 including the pixel region value and the single distinct value associated with the individual pixel region, and/or provide other operations as discussed herein. In general, memory stores 1220 may be communicatively coupled to graphics processing unit 1230. Memory stores 1220 may include graphics buffer 1240, which may be accessed by graphics data codec module 1235 to retrieve graphics data 1245. Furthermore, display device 1370 may be configured to display output image data (not shown) based at least in part on graphics data 1245. As discussed, graphics data codec module 1235 may be further configured to access and/or decompress graphics data 1245 as discussed herein.

As will be appreciated, the modules illustrated in FIG. 13 may include a variety of software and/or hardware modules and/or modules that may be implemented via software and/or hardware. For example, the modules may be implemented as software via central processing units 1306 and/or graphics processing units 1230 or the modules may be implemented via a dedicated hardware portion or portions of graphics processing units 1230. Furthermore, the shown memory stores 1220 may be shared memory for central processing units 1206 and/or graphics processing units 1220, for example. Furthermore, graphics buffer 1240 may be implemented via memory stores 1220 or separately from memory stores 1220 and/or graphics buffer 1240 may be implemented via a general buffer that may include other buffer portions such as a render buffer, or the like. Also, system 100 may be implemented in a variety of ways. For example, system 100 (excluding display device 1370) may be implemented as a single chip or device having a graphics processor, a quad-core central processing unit, on-board cache, and a memory controller input/output (I/O) module (not shown). In other examples, system 100 (again excluding display device 1370) may be implemented as a chipset.

Central processing units 1306 may include any suitable implementation including, for example, microprocessor(s), multicore processors, application specific integrated circuits, chip(s), chipsets, or the like. Furthermore, graphics processing units 1230 may include any suitable implementation including, for example, processor(s), multicore processors, application specific integrated circuits, programmable logic devices, graphics cards, integrated graphics, general purpose graphics processing unit(s), or the like. In addition, memory stores 1220 and/or graphics buffer 1240 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1220 and/or graphics buffer 1240 may be implemented via cache memory. In various examples, system 100 may be implemented as a chipset or as a system on a chip.

Figure 14:
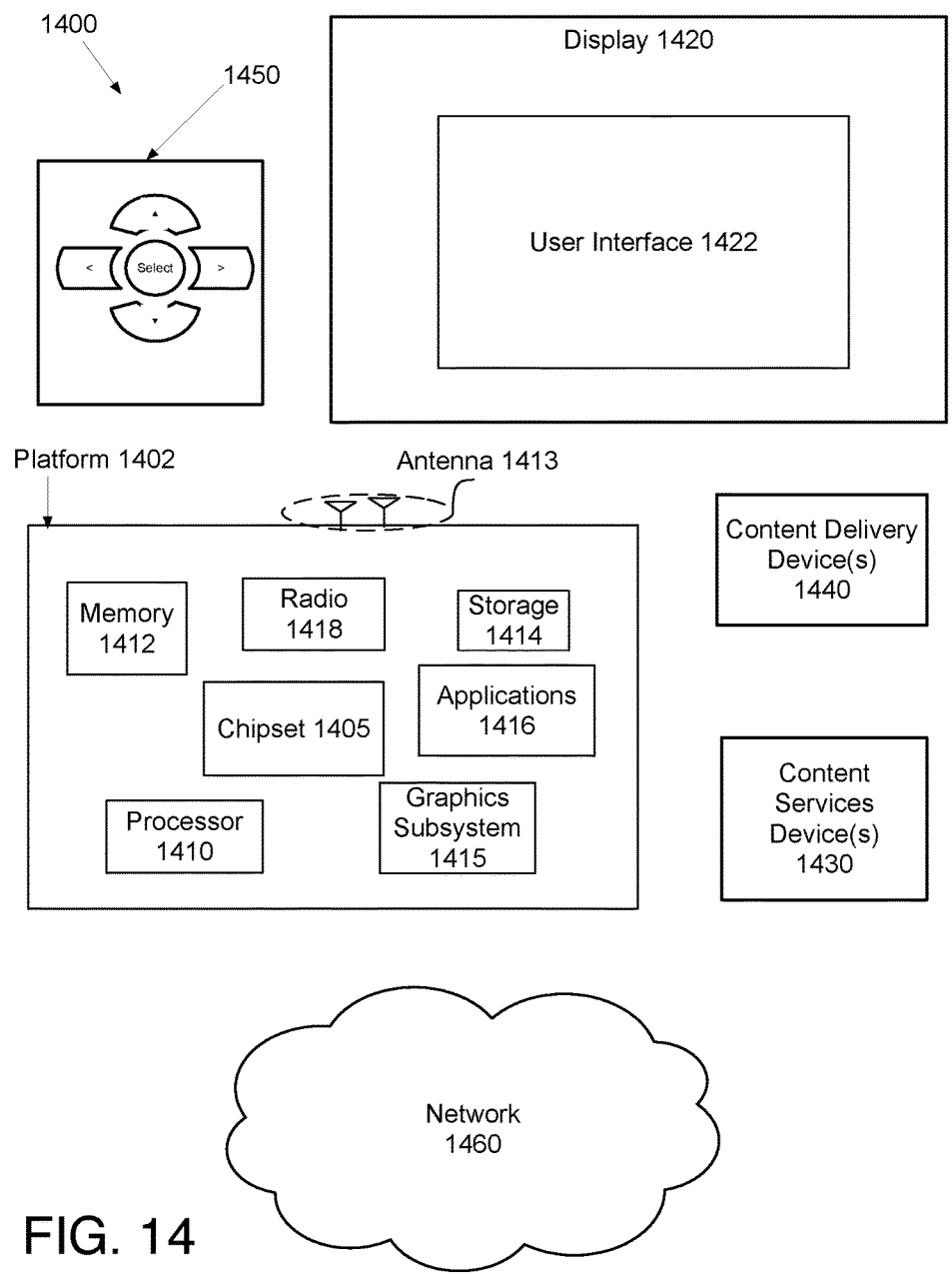
FIG. 14 is an illustrative diagram of an example system.

FIG. 14 illustrates an example system 1400 in accordance with the present disclosure. In various implementations, system 1400 may be a media system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 820 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In embodiments, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 7.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
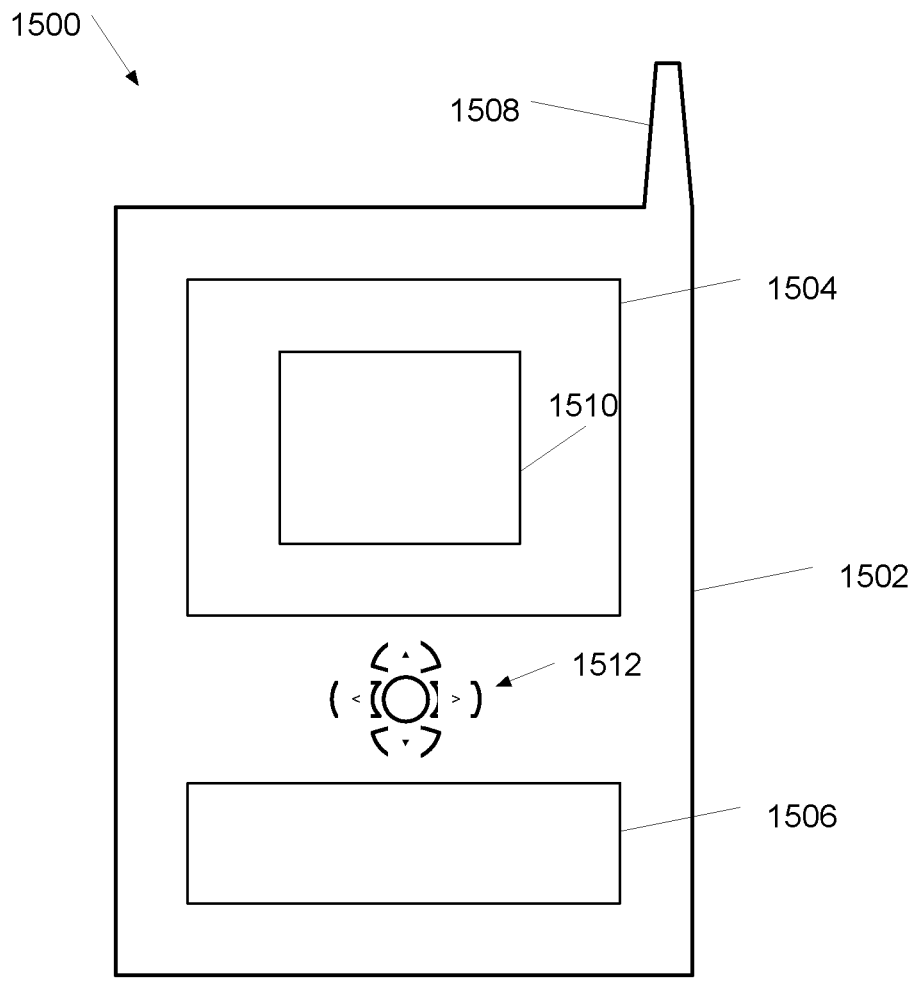
FIG. 15 illustrates an example device, all arranged in accordance with at least some implementations of the present disclosure.

As described above, system 1400 may be embodied in varying physical styles or form factors. FIG. 15 illustrates implementations of a small form factor device 1500 in which system 1400 may be embodied. In embodiments, for example, device 1400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing 1502, a display 1504, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional embodiments.

In one example, a computer-implemented method for providing compression in graphics rendering may include determining a plurality of values associated with individual pixels of a tile of pixels, determining, based at least in part on the tile of pixels, a plurality of pixel regions, wherein each pixel region includes a corresponding subset of the individual pixels, determining, for an individual pixel region of the plurality of pixel regions, the subset of values associated with the subset of individual pixels corresponding to the individual pixel region comprises a single distinct value, setting a pixel region value for the individual pixel region to a bit value indicating the individual pixel region comprises the single distinct value, and/or storing, in memory, graphics data including the pixel region value and the single distinct value associated with the individual pixel region.

In other examples of a computer-implemented method for providing compression in graphics rendering may include determining, for a second individual pixel region of the plurality of pixel regions, the subset of values associated with second individual pixels in the second individual pixel region includes two distinct values, setting a second pixel region value for the second individual pixel region to a second bit value indicating the second individual pixel region includes two distinct values, setting, for an individual pixel in the second pixel region, an individual pixel indicator value indicating the individual pixel is associated with a first value of the two distinct values such that the graphics data includes the second pixel region value, the individual pixel indicator value, and the two distinct values, determining, for a third individual pixel region of the plurality of pixel regions, the subset of values associated with third individual pixels in the third individual pixel region includes three or more distinct values, setting a third pixel region value for the third individual pixel region to a third bit value indicating the third individual pixel region includes the three or more distinct values, such that the graphics data includes the third pixel region value and the three or more distinct values corresponding to the third individual pixel region, and such that the three or more distinct values include four distinct values, determining, for a fourth individual pixel region of the plurality of pixel regions, the subset of values associated with fourth individual pixels in the fourth individual pixel region includes two or more distinct values, setting a fourth pixel region value for the fourth individual pixel region to a fourth bit value indicating the fourth individual pixel region includes the two or more distinct values such that the graphics data includes the fourth pixel region value and the two or more distinct values corresponding to the fourth individual pixel region, rendering the tile of pixels such that rendering the tile of pixels may include rasterization including applying at least one of a visibility function or a shading function, and such that rendering the tile of pixels may include applying at least one of a super-sampling anti-aliasing technique or a multi-sampling anti-aliasing technique, applying, prior to storing, a compression to the graphics data, determining a number of bits for the graphics data such that the graphics data includes a plurality of pixel region values corresponding to the individual pixels of the tile, such that the plurality of pixel region values includes the pixel region value, the second pixel region value, and the third pixel region value, such that the graphics data further includes a second plurality of values, such that the second plurality of values includes fewer values than the plurality of values, such that the second plurality of values includes the single distinct value associated with the individual pixel region, the two distinct values, and the three or more distinct values, and such that the graphics data further includes a plurality of pixel indicator values corresponding to the second pixel region, and such that the plurality of pixel indicator values comprises the first pixel indicator value, determining a bit budget, comparing the number of bits for the graphics data with the bit budget, and, if the number of bits for the graphics data is less than the bit budget, storing, in memory, the graphics data, and if the number of bits for the graphics data is greater than the bit budget, storing, in memory, second graphics data comprising the plurality of values associated with individual pixels of the tile of pixels, wherein the bit budget comprises one of a plurality of available bit budgets, accessing the graphics data such that accessing the graphics data includes at least one of reading the graphics data from the memory or reading and decompressing the graphics data, determining the plurality of values associated with individual pixels of the tile of pixels based at least in part on the accessed graphics data, wherein determining the plurality of values associated with individual pixels of the tile of pixels includes distributing the single distinct value to each pixel of the individual pixel region based at least in part on the pixel region value, distributing the first value of the two distinct values to the individual pixel in the second pixel region based at least in part on the second pixel region value and the individual pixel indicator value, and distributing the first value of the two distinct values to a first pixel in the second pixel region based at least in part on the first pixel being the first pixel in an order of pixels for the second pixel region. Determining the subset of values associated with the subset of individual pixels corresponding to the individual pixel region comprise the single distinct value may include comparing the subset of values. The plurality of values may include at least one of color values, surface normal values, or multi-sampling anti-aliasing color plane values. The tile of pixels may include an 8 pixels wide by 4 pixels high tile of pixels such that each pixel region may include a 2 pixel wide by 2 pixel high region of pixels, and such that the plurality of pixel regions comprise 8 pixel regions. The bit value may include a bit value of one, the second bit value may include a bit value of two, and the third bit value may include a bit value of zero.

In another example, a system for compression in graphics rendering on a computer may include a graphics buffer, a graphics processing unit, and a display device. The graphics processing unit may include a graphics codec module. The graphics processing unit may be communicatively coupled to the graphics buffer and the graphics codec module may be configured to determine a plurality of values associated with individual pixels of a tile of pixels, determine, based at least in part on the tile of pixels, a plurality of pixel regions such that each pixel region comprises a corresponding subset of the individual pixels, determine, for an individual pixel region of the plurality of pixel regions, the subset of values associated with the subset of individual pixels corresponding to the individual pixel region comprises a single distinct value, set a pixel region value for the individual pixel region to a bit value indicating the individual pixel region includes the single distinct value, and store, in the graphics buffer, graphics data comprising the pixel region value and the single distinct value associated with the individual pixel region. The display device may be configured to display output image data based at least in part on the graphics data.

In other examples of systems for providing compression in graphics rendering on a computer, the graphics codec module may be further configured to determine, for a second individual pixel region of the plurality of pixel regions, the subset of values associated with second individual pixels in the second individual pixel region includes two distinct values, set a second pixel region value for the second individual pixel region to a second bit value indicating the second individual pixel region includes two distinct values, sett, for an individual pixel in the second pixel region, an individual pixel indicator value indicating the individual pixel is associated with a first value of the two distinct values such that the graphics data includes the second pixel region value, the individual pixel indicator value, and the two distinct values, determine, for a third individual pixel region of the plurality of pixel regions, the subset of values associated with third individual pixels in the third individual pixel region includes three or more distinct values, set a third pixel region value for the third individual pixel region to a third bit value indicating the third individual pixel region includes the three or more distinct values, such that the graphics data includes the third pixel region value and the three or more distinct values corresponding to the third individual pixel region, and such that the three or more distinct values include four distinct values, determine, for a fourth individual pixel region of the plurality of pixel regions, the subset of values associated with fourth individual pixels in the fourth individual pixel region includes two or more distinct values, set a fourth pixel region value for the fourth individual pixel region to a fourth bit value indicating the fourth individual pixel region includes the two or more distinct values such that the graphics data includes the fourth pixel region value and the two or more distinct values corresponding to the fourth individual pixel region, render the tile of pixels such that rendering the tile of pixels may include rasterization including applying at least one of a visibility function or a shading function, and such that rendering the tile of pixels may include applying at least one of a super-sampling anti-aliasing technique or a multi-sampling anti-aliasing technique, apply, prior to storing, a compression to the graphics data, determine a number of bits for the graphics data such that the graphics data includes a plurality of pixel region values corresponding to the individual pixels of the tile, such that the plurality of pixel region values includes the pixel region value, the second pixel region value, and the third pixel region value, such that the graphics data further includes a second plurality of values, such that the second plurality of values includes fewer values than the plurality of values, such that the second plurality of values includes the single distinct value associated with the individual pixel region, the two distinct values, and the three or more distinct values, and such that the graphics data further includes a plurality of pixel indicator values corresponding to the second pixel region, and such that the plurality of pixel indicator values comprises the first pixel indicator value, determine a bit budget, compare the number of bits for the graphics data with the bit budget, and, if the number of bits for the graphics data is less than the bit budget, store, in memory, the graphics data, and if the number of bits for the graphics data is greater than the bit budget, store, in memory, second graphics data including the plurality of values associated with individual pixels of the tile of pixels, such that the bit budget includes one of a plurality of available bit budgets, access the graphics data such that accessing the graphics data includes at least one of reading the graphics data from the memory or reading and decompressing the graphics data, determine the plurality of values associated with individual pixels of the tile of pixels based at least in part on the accessed graphics data, such that determining the plurality of values associated with individual pixels of the tile of pixels includes distributing the single distinct value to each pixel of the individual pixel region based at least in part on the pixel region value, distributing the first value of the two distinct values to the individual pixel in the second pixel region based at least in part on the second pixel region value and the individual pixel indicator value, and distributing the first value of the two distinct values to a first pixel in the second pixel region based at least in part on the first pixel being the first pixel in an order of pixels for the second pixel region. Determination the subset of values associated with the subset of individual pixels corresponding to the individual pixel region includes the single distinct value may include comparing the subset of values. The plurality of values may include at least one of color values, surface normal values, or multi-sampling anti-aliasing color plane values. The tile of pixels may include an 8 pixels wide by 4 pixels high tile of pixels such that each pixel region may include a 2 pixel wide by 2 pixel high region of pixels, and such that the plurality of pixel regions comprise 8 pixel regions. The bit value may include a bit value of one, the second bit value may include a bit value of two, and the third bit value may include a bit value of zero.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for providing compression in graphics rendering comprising:
   determining a plurality of values associated with individual pixels of a tile of pixels;
   determining, based at least in part on the tile of pixels, a plurality of pixel regions, wherein each pixel region comprises a corresponding subset of the individual pixels;
   determining, for an individual pixel region of the plurality of pixel regions, the subset of values associated with the subset of individual pixels corresponding to the individual pixel region comprises a single distinct value;
   setting a pixel region value for the individual pixel region to a bit value indicating the individual pixel region comprises the single distinct value;
   storing, in memory, graphics data comprising the pixel region value and the single distinct value associated with the individual pixel region;
   determining a number of bits for the graphics data;
   determining a bit budget;
   comparing the number of bits for the graphics data with the bit budget, and
   if the number of bits for the graphics data is less than the bit budget, storing, in memory, the graphics data; and
   if the number of bits for the graphics data is greater than the bit budget, storing, in memory, second graphics data comprising the plurality of values associated with individual pixels of the tile of pixels, wherein the bit budget comprises one of a plurality of available bit budgets.

2. The method of claim 1, further comprising:
   determining, for a second individual pixel region of the plurality of pixel regions, the subset of values associated with second individual pixels in the second individual pixel region comprises two or more distinct values; and
   setting a second pixel region value for the second individual pixel region to a second bit value indicating the second individual pixel region comprises the two or more distinct values, wherein the graphics data comprises the second pixel region value and the two or more distinct values corresponding to the third individual pixel region.

3. The method of claim 1, further comprising:
determining, for a second individual pixel region of the plurality of pixel regions, the subset of values associated with second individual pixels in the second individual pixel region comprises two distinct values;
setting a second pixel region value for the second individual pixel region to a second bit value indicating the second individual pixel region comprises two distinct values; and
setting, for an individual pixel in the second pixel region, an individual pixel indicator value indicating the individual pixel is associated with a first value of the two distinct values, wherein the graphics data comprises the second pixel region value, the individual pixel indicator value, and the two distinct values.

4. The method of claim 1, further comprising:
determining, for a second individual pixel region of the plurality of pixel regions, the subset of values associated with second individual pixels in the second individual pixel region comprises two distinct values;
setting a second pixel region value for the second individual pixel region to a second bit value indicating the second individual pixel region comprises two distinct values;
setting, for an individual pixel in the second pixel region, an individual pixel indicator value indicating the individual pixel is associated with a first value of the two distinct values, wherein the graphics data comprises the second pixel region value, the individual pixel indicator value, and the two distinct values;
determining, for a third individual pixel region of the plurality of pixel regions, the subset of values associated with third individual pixels in the third individual pixel region comprises three or more distinct values; and
setting a third pixel region value for the third individual pixel region to a third bit value indicating the third individual pixel region comprises the three or more distinct values, wherein the graphics data comprises the third pixel region value and the three or more distinct values corresponding to the third individual pixel region.

5. The method of claim 1, further comprising:
determining, for a second individual pixel region of the plurality of pixel regions, the subset of values associated with second individual pixels in the second individual pixel region comprises two distinct values;
setting a second pixel region value for the second individual pixel region to a second bit value indicating the second individual pixel region comprises two distinct values;
setting, for an individual pixel in the second pixel region, an individual pixel indicator value indicating the individual pixel is associated with a first value of the two distinct values, wherein the graphics data comprises the second pixel region value, the individual pixel indicator value, and the two distinct values;
determining, for a third individual pixel region of the plurality of pixel regions, the subset of values associated with third individual pixels in the third individual pixel region comprises three or more distinct values; and
setting a third pixel region value for the third individual pixel region to a third bit value indicating the third individual pixel region comprises the three or more distinct values, wherein the graphics data comprises the third pixel region value and the three or more distinct values corresponding to the third individual pixel region, wherein the bit value comprises a bit value of one, the second bit value comprises a bit value of two, and the third bit value comprises a bit value of zero.

6. The method of claim 1, further comprising:
accessing the graphics data;
determining a number of values in the graphics data based at least in part on the graphics data; and
determining the plurality of values associated with individual pixels of the tile of pixels based at least in part on the accessed graphics data, wherein determining the plurality of values associated with individual pixels of the tile of pixels comprises:
distributing the single distinct value to each pixel of the individual pixel region based at least in part on the pixel region value.

7. The method of claim 1, further comprising:
determining, for a second individual pixel region of the plurality of pixel regions, the subset of values associated with second individual pixels in the second individual pixel region comprises two distinct values;
setting a second pixel region value for the second individual pixel region to a second bit value indicating the second individual pixel region comprises two distinct values;
setting, for an individual pixel in the second pixel region, an individual pixel indicator value indicating the individual pixel is associated with a first value of the two distinct values, wherein the graphics data comprises the second pixel region value, the individual pixel indicator value, and the two distinct values;
determining, for a third individual pixel region of the plurality of pixel regions, the subset of values associated with third individual pixels in the third individual pixel region comprises three or more distinct values;
setting a third pixel region value for the third individual pixel region to a third bit value indicating the third individual pixel region comprises the three or more distinct values, wherein the graphics data comprises the third pixel region value and the three or more distinct values corresponding to the third individual pixel region, and wherein the three or more distinct values comprise four distinct values;
determining, for a fourth individual pixel region of the plurality of pixel regions, the subset of values associated with fourth individual pixels in the fourth individual pixel region comprises two or more distinct values;
setting a fourth pixel region value for the fourth individual pixel region to a fourth bit value indicating the fourth individual pixel region comprises the two or more distinct values, wherein the graphics data comprises the fourth pixel region value and the two or more distinct values corresponding to the fourth individual pixel region;
rendering the tile of pixels, wherein rendering the tile of pixels comprises rasterization comprising applying at least one of a visibility function or a shading function, and wherein rendering the tile of pixels comprises applying at least one of a super-sampling anti-aliasing technique or a multi-sampling anti-aliasing technique;
applying, prior to storing, a compression to the graphics data;
wherein the graphics data comprises a plurality of pixel region values corresponding to the individual pixels of the tile, wherein the plurality of pixel region values comprises the pixel region value, the second pixel region value, and the third pixel region value, wherein the graphics data further comprises a second plurality of values, wherein the second plurality of values comprises fewer values than the plurality of values, wherein the second plurality of values comprises the single distinct value associated with the individual pixel region, the two distinct values, and the three or more distinct values, and wherein the graphics data further comprises a plurality of pixel indicator values corresponding to the second pixel region, and wherein the plurality of pixel indicator values comprises the first pixel indicator value;

accessing the graphics data, wherein accessing the graphics data comprises at least one of reading the graphics data from the memory or reading and decompressing the graphics data;

determining a number of values in the graphics data based at least in part on the graphics data; and determining the plurality of values associated with individual pixels of the tile of pixels based at least in part on the accessed graphics data, wherein determining the plurality of values associated with individual pixels of the tile of pixels comprises:

distributing the single distinct value to each pixel of the individual pixel region based at least in part on the pixel region value;

distributing the first value of the two distinct values to the individual pixel in the second pixel region based at least in part on the second pixel region value and the individual pixel indicator value;

distributing the first value of the two distinct values to a first pixel in the second pixel region based at least in part on the first pixel being the first pixel in an order of pixels for the second pixel region; and distributing the three or more distinct values to pixels of the third pixel region, wherein determining the subset of values associated with the subset of individual pixels corresponding to the individual pixel region comprise the single distinct value comprises comparing the subset of values, wherein the plurality of values comprise at least one of color values, surface normal values, or multi-sampling anti-aliasing color plane values, wherein the tile of pixels comprises an 8 pixels wide by 4 pixels high tile of pixels, wherein each pixel region comprises a 2 pixel wide by 2 pixel high region of pixels, and wherein the plurality of pixel regions comprise 8 pixel regions, and wherein the bit value comprises a bit value of one, the second bit value comprises a bit value of two, and the third bit value comprises a bit value of zero.

8. A system for providing compression in graphics rendering on a computer, comprising:

a graphics buffer;

a graphics processing unit comprising a graphics data codec module, wherein the graphics processing unit is communicatively coupled to the graphics buffer and wherein the graphics data codec module is configured to:

determine a plurality of values associated with individual pixels of a tile of pixels;

determine, based at least in part on the tile of pixels, a plurality of pixel regions, wherein each pixel region comprises a corresponding subset of the individual pixels;

determine, for an individual pixel region of the plurality of pixel regions, the subset of values associated with the subset of individual pixels corresponding to the individual pixel region comprises a single distinct value;

set a pixel region value for the individual pixel region to a bit value indicating the individual pixel region comprises the single distinct value;

store, in the graphics buffer, graphics data comprising the pixel region value and the single distinct value associated with the individual pixel region;

determine a number of bits for the graphics data;

determine a bit budget;

compare the number of bits for the graphics data with the bit budget, and if the number of bits for the graphics data is less than the bit budget, the graphics data codec module is configured to store, in memory, the graphics data; and if the number of bits for the graphics data is greater than the bit budget, the graphics data codec module is configured to store, in memory, second graphics data comprising the plurality of values associated with individual pixels of the tile of pixels, wherein the bit budget comprises one of a plurality of available bit budgets.

9. The system of claim 8, wherein the graphics data codec module is further configured to:

determine, for a second individual pixel region of the plurality of pixel regions, the subset of values associated with second individual pixels in the second individual pixel region comprises two or more distinct values;

set a second pixel region value for the second individual pixel region to a second bit value indicating the second individual pixel region comprises the two or more distinct values, wherein the graphics data comprises the second pixel region value and the two or more distinct values corresponding to the second individual pixel region.

10. The system of claim 8, wherein the graphics data codec module is further configured to:

determine, for a second individual pixel region of the plurality of pixel regions, the subset of values associated with second individual pixels in the second individual pixel region comprises two distinct values;

set a second pixel region value for the second individual pixel region to a second bit value indicating the second individual pixel region comprises two distinct values; and set, for an individual pixel in the second pixel region, an individual pixel indicator value indicating the individual pixel is associated with a first value of the two distinct values, wherein the graphics data comprises the second pixel region value, the individual pixel indicator value, and the two distinct values.

11. The system of claim 8, wherein the graphics data codec module is further configured to:

determine, for a second individual pixel region of the plurality of pixel regions, the subset of values associated with second individual pixels in the second individual pixel region comprises two distinct values;

set a second pixel region value for the second individual pixel region to a second bit value indicating the second individual pixel region comprises two distinct values;

set, for an individual pixel in the second pixel region, an individual pixel indicator value indicating the individual pixel is associated with a first value of the two distinct values, wherein the graphics data comprises the second pixel region value, the individual pixel indicator value, and the two distinct values;

determine, for a third individual pixel region of the plurality of pixel regions, the subset of values associated with third individual pixels in the third individual pixel region comprises three or more distinct values;

set a third pixel region value for the third individual pixel region to a third bit value indicating the third individual pixel region comprises the three or more distinct values, wherein the graphics data comprises the third pixel region value and the three or more distinct values corresponding to the third individual pixel region.

12. The system of claim 8, wherein the graphics data codec module is further configured to:

determine, for a second individual pixel region of the plurality of pixel regions, the subset of values associated with second individual pixels in the second individual pixel region comprises two distinct values;

set a second pixel region value for the second individual pixel region to a second bit value indicating the second individual pixel region comprises two distinct values;

set, for an individual pixel in the second pixel region, an individual pixel indicator value indicating the individual pixel is associated with a first value of the two distinct values, wherein the graphics data comprises the second pixel region value, the individual pixel indicator value, and the two distinct values;

determine, for a third individual pixel region of the plurality of pixel regions, the subset of values associated with third individual pixels in the third individual pixel region comprises three or more distinct values;

set a third pixel region value for the third individual pixel region to a third bit value indicating the third individual pixel region comprises the three or more distinct values, wherein the graphics data comprises the third pixel region value and the three or more distinct values corresponding to the third individual pixel region, wherein the bit value comprises a bit value of one, the second bit value comprises a bit value of two, and the third bit value comprises a bit value of zero.

13. The system of claim 8, wherein the graphics data codec module is further configured to:

access the graphics data;

determine a number of values in the graphics data based at least in part on the graphics data; and determine the plurality of values associated with individual pixels of the tile of pixels based at least in part on the accessed graphics data, wherein determination of the plurality of values associated with individual pixels of the tile of pixels comprises:

distributing the single distinct value to each pixel of the individual pixel region based at least in part on the pixel region value.

14. The system of claim 8, further comprising:

a display device configured to display output image data based at least in part on the graphics data, wherein the graphics data codec module is further configured to:

determine, for a second individual pixel region of the plurality of pixel regions, the subset of values associated with second individual pixels in the second individual pixel region comprises two distinct values;

set a second pixel region value for the second individual pixel region to a second bit value indicating the second individual pixel region comprises two distinct values;

set, for an individual pixel in the second pixel region, an individual pixel indicator value indicating the individual pixel is associated with a first value of the two distinct values, wherein the graphics data comprises the second pixel region value, the individual pixel indicator value, and the two distinct values;

determine, for a third individual pixel region of the plurality of pixel regions, the subset of values associated with third individual pixels in the third individual pixel region comprises three or more distinct values;

set a third pixel region value for the third individual pixel region to a third bit value indicating the third individual pixel region comprises the three or more distinct values, wherein the graphics data comprises the third pixel region value and the three or more distinct values corresponding to the third individual pixel region, and wherein the three or more distinct values comprise four distinct values;

determine, for a fourth individual pixel region of the plurality of pixel regions, the subset of values associated with fourth individual pixels in the fourth individual pixel region comprises two or more distinct values;

set a fourth pixel region value for the fourth individual pixel region to a fourth bit value indicating the fourth individual pixel region comprises the two or more distinct values, wherein the graphics data comprises the fourth pixel region value and the two or more distinct values corresponding to the fourth individual pixel region;

render the tile of pixels, wherein rendering the tile of pixels comprises rasterization comprising applying at least one of a visibility function or a shading function, and wherein to render the tile of pixels comprises applying at least one of a super-sampling anti-aliasing technique, or a multi-sampling anti-aliasing technique;

apply, prior to storing, a compression to the graphics data;

wherein the graphics data comprises a plurality of pixel region values corresponding to the individual pixels of the tile, wherein the plurality of pixel region values comprises the pixel region value, the second pixel region value, and the third pixel region value, wherein the graphics data further comprises a second plurality of values, wherein the second plurality of values comprises fewer values than the plurality of values, wherein the second plurality of values comprises the single distinct value associated with the individual pixel region, the two distinct values, and the three or more distinct values, and wherein the graphics data further comprises a plurality of pixel indicator values corresponding to the second pixel region, and wherein the plurality of pixel indicator values comprises the first pixel indicator value;

access the graphics data, wherein to access the graphics data comprises at least one of reading the graphics data from the memory or reading and decompressing the graphics data;

determine a number of values in the graphics data based at least in part on the graphics data; and determine the plurality of values associated with individual pixels of the tile of pixels based at least in part on the accessed graphics data, wherein determination of the plurality of values associated with individual pixels of the tile of pixels comprises:

distributing the single distinct value to each pixel of the individual pixel region based at least in part on the pixel region value;

distributing the first value of the two distinct values to the individual pixel in the second pixel region based at least in part on the second pixel region value and the individual pixel indicator value;

distributing the first value of the two distinct values to a first pixel in the second pixel region based at least in part on the first pixel being the first pixel in an order of pixels for the second pixel region; and distributing the three or more distinct values to pixels of the third pixel region, wherein determination of the subset of values associated with the subset of individual pixels corresponding to the individual pixel region comprise the single distinct value comprises comparing the subset of values, wherein the plurality of values comprise at least one of color values, surface normal values, or multi-sampling anti-aliasing color plane values, wherein the tile of pixels comprises an 8 pixels wide by 4 pixels high tile of pixels, wherein each pixel region comprises a 2 pixel wide by 2 pixel high region of pixels, and wherein the plurality of pixel regions comprise 8 pixel regions, and wherein the bit value comprises a bit value of one, the second bit value comprises a bit value of two, and the third bit value comprises a bit value of zero.

15. At least one non-transitory machine readable medium comprising a plurality of instructions that in response to being executed on a computing device, cause the computing device to provide compression in graphics rendering by:

determining a plurality of values associated with individual pixels of a tile of pixels;

determining, based at least in part on the tile of pixels, a plurality of pixel regions, wherein each pixel region comprises a corresponding subset of the individual pixels;

determining, for an individual pixel region of the plurality of pixel regions, the subset of values associated with the subset of individual pixels corresponding to the individual pixel region comprises a single distinct value;

setting a pixel region value for the individual pixel region to a bit value indicating the individual pixel region comprises the single distinct value;

storing, in memory, graphics data comprising the pixel region value and the single distinct value associated with the individual pixel region;

determining a number of bits for the graphics data;

determining a bit budget;

comparing the number of bits for the graphics data with the bit budget, and if the number of bits for the graphics data is less than the bit budget, storing, in memory, the graphics data; and if the number of bits for the graphics data is greater than the bit budget, storing, in memory, second graphics data comprising the plurality of values associated with individual pixels of the tile of pixels, wherein the bit budget comprises one of a plurality of available bit budgets.

16. The non-transitory machine readable medium of claim 15, further comprising instructions that in response to being executed on the computing device, cause the computing device to provide compression in graphics rendering by:

determining, for a second individual pixel region of the plurality of pixel regions, the subset of values associated with second individual pixels in the second individual pixel region comprises two distinct values;

setting a second pixel region value for the second individual pixel region to a second bit value indicating the second individual pixel region comprises two distinct values;

setting, for an individual pixel in the second pixel region, an individual pixel indicator value indicating the individual pixel is associated with a first value of the two distinct values, wherein the graphics data comprises the second pixel region value, the individual pixel indicator value, and the two distinct values;

determining, for a third individual pixel region of the plurality of pixel regions, the subset of values associated with third individual pixels in the third individual pixel region comprises three or more distinct values;

setting a third pixel region value for the third individual pixel region to a third bit value indicating the third individual pixel region comprises the three or more distinct values, wherein the graphics data comprises the third pixel region value and the three or more distinct values corresponding to the third individual pixel region, and wherein the three or more distinct values comprise four distinct values;

determining, for a fourth individual pixel region of the plurality of pixel regions, the subset of values associated with fourth individual pixels in the fourth individual pixel region comprises two or more distinct values;

setting a fourth pixel region value for the fourth individual pixel region to a fourth bit value indicating the fourth individual pixel region comprises the two or more distinct values, wherein the graphics data comprises the fourth pixel region value and the two or more distinct values corresponding to the fourth individual pixel region;

rendering the tile of pixels, wherein rendering the tile of pixels comprises rasterization comprising applying at least one of a visibility function or a shading function, and wherein rendering the tile of pixels comprises applying at least one of a super-sampling anti-aliasing technique or a multi-sampling anti-aliasing technique;

applying, prior to storing, a compression to the graphics data;

wherein the graphics data comprises a plurality of pixel region values corresponding to the individual pixels of the tile, wherein the plurality of pixel region values comprises the pixel region value, the second pixel region value, and the third pixel region value, wherein the graphics data further comprises a second plurality of values, wherein the second plurality of values comprises fewer values than the plurality of values, wherein the second plurality of values comprises the single distinct value associated with the individual pixel region, the two distinct values, and the three or more distinct values, and wherein the graphics data further comprises a plurality of pixel indicator values corresponding to the second pixel region, and wherein the plurality of pixel indicator values comprises the first pixel indicator value;

accessing the graphics data, wherein accessing the graphics data comprises at least one of reading the graphics data from the memory or reading and decompressing the graphics data;

determining a number of values in the graphics data based at least in part on the graphics data; and determining the plurality of values associated with individual pixels of the tile of pixels based at least in part on the accessed graphics data, wherein determining the plurality of values associated with individual pixels of the tile of pixels comprises:
  distributing the single distinct value to each pixel of the individual pixel region based at least in part on the pixel region value;
  distributing the first value of the two distinct values to the individual pixel in the second pixel region based at least in part on the second pixel region value and the individual pixel indicator value;
  distributing the first value of the two distinct values to a first pixel in the second pixel region based at least in part on the first pixel being the first pixel in an order of pixels for the second pixel region; and
  distributing the three or more distinct values to pixels of the third pixel region,
wherein determining the subset of values associated with the subset of individual pixels corresponding to the individual pixel region comprise the single distinct value comprises comparing the subset of values,
wherein the plurality of values comprise at least one of color values, surface normal values, or multi-sampling anti-aliasing color plane values,
wherein the tile of pixels comprises an 8 pixels wide by 4 pixels high tile of pixels, wherein each pixel region comprises a 2 pixel wide by 2 pixel high region of pixels, and wherein the plurality of pixel regions comprise 8 pixel regions, and
wherein the bit value comprises a bit value of one, the second bit value comprises a bit value of two, and the third bit value comprises a bit value of zero.

17. A computer-implemented method for providing compression in graphics rendering comprising:
  determining a plurality of values associated with individual pixels of a tile of pixels;
  determining, based at least in part on the tile of pixels, a plurality of pixel regions, wherein each pixel region comprises a corresponding subset of the individual pixels;
  determining, for an individual pixel region of the plurality of pixel regions, the subset of values associated with the subset of individual pixels corresponding to the individual pixel region comprises a single distinct value;
  setting a pixel region value for the individual pixel region to a bit value indicating the individual pixel region comprises the single distinct value;
  storing, in memory, graphics data comprising the pixel region value and the single distinct value associated with the individual pixel region;
  accessing the graphics data;
  determining a number of values in the graphics data based at least in part on the graphics data; and
  determining the plurality of values associated with individual pixels of the tile of pixels based at least in part on the accessed graphics data, wherein determining the plurality of values associated with individual pixels of the tile of pixels comprises: distributing the single distinct value to each pixel of the individual pixel region based at least in part on the pixel region value.

18. The method of claim 17, further comprising:
  determining, for a second individual pixel region of the plurality of pixel regions, the subset of values associated with second individual pixels in the second individual pixel region comprises two or more distinct values; and
  setting a second pixel region value for the second individual pixel region to a second bit value indicating the second individual pixel region comprises the two or more distinct values, wherein the graphics data comprises the second pixel region value and the two or more distinct values corresponding to the third individual pixel region.

19. The method of claim 17, further comprising:
  determining, for a second individual pixel region of the plurality of pixel regions, the subset of values associated with second individual pixels in the second individual pixel region comprises two distinct values;
  setting a second pixel region value for the second individual pixel region to a second bit value indicating the second individual pixel region comprises two distinct values; and
  setting, for an individual pixel in the second pixel region, an individual pixel indicator value indicating the individual pixel is associated with a first value of the two distinct values, wherein the graphics data comprises the second pixel region value, the individual pixel indicator value, and the two distinct values.

20. The method of claim 17, further comprising:
  determining, for a second individual pixel region of the plurality of pixel regions, the subset of values associated with second individual pixels in the second individual pixel region comprises two distinct values;
  setting a second pixel region value for the second individual pixel region to a second bit value indicating the second individual pixel region comprises two distinct values;
  setting, for an individual pixel in the second pixel region, an individual pixel indicator value indicating the individual pixel is associated with a first value of the two distinct values, wherein the graphics data comprises the second pixel region value, the individual pixel indicator value, and the two distinct values;
  determining, for a third individual pixel region of the plurality of pixel regions, the subset of values associated with third individual pixels in the third individual pixel region comprises three or more distinct values; and
  setting a third pixel region value for the third individual pixel region to a third bit value indicating the third individual pixel region comprises the three or more distinct values, wherein the graphics data comprises the third pixel region value and the three or more distinct values corresponding to the third individual pixel region.

21. The method of claim 17, further comprising:
  determining, for a second individual pixel region of the plurality of pixel regions, the subset of values associated with second individual pixels in the second individual pixel region comprises two distinct values;
  setting a second pixel region value for the second individual pixel region to a second bit value indicating the second individual pixel region comprises two distinct values;
  setting, for an individual pixel in the second pixel region, an individual pixel indicator value indicating the individual pixel is associated with a first value of the two distinct values, wherein the graphics data comprises the second pixel region value, the individual pixel indicator value, and the two distinct values;
  determining, for a third individual pixel region of the plurality of pixel regions, the subset of values associated with third individual pixels in the third individual pixel region comprises three or more distinct values; and setting a third pixel region value for the third individual pixel region to a third bit value indicating the third individual pixel region comprises the three or more distinct values, wherein the graphics data comprises the third pixel region value and the three or more distinct values corresponding to the third individual pixel region, wherein the bit value comprises a bit value of one, the second bit value comprises a bit value of two, and the third bit value comprises a bit value of zero.

22. The method of claim 17, further comprising:
determining, for a second individual pixel region of the plurality of pixel regions, the subset of values associated with second individual pixels in the second individual pixel region comprises two distinct values;
setting a second pixel region value for the second individual pixel region to a second bit value indicating the second individual pixel region comprises two distinct values;
setting, for an individual pixel in the second pixel region, an individual pixel indicator value indicating the individual pixel is associated with a first value of the two distinct values, wherein the graphics data comprises the second pixel region value, the individual pixel indicator value, and the two distinct values;
determining, for a third individual pixel region of the plurality of pixel regions, the subset of values associated with third individual pixels in the third individual pixel region comprises three or more distinct values;
setting a third pixel region value for the third individual pixel region to a third bit value indicating the third individual pixel region comprises the three or more distinct values, wherein the graphics data comprises the third pixel region value and the three or more distinct values corresponding to the third individual pixel region, and wherein the three or more distinct values comprise four distinct values;
determining, for a fourth individual pixel region of the plurality of pixel regions, the subset of values associated with fourth individual pixels in the fourth individual pixel region comprises two or more distinct values;
setting a fourth pixel region value for the fourth individual pixel region to a fourth bit value indicating the fourth individual pixel region comprises the two or more distinct values, wherein the graphics data comprises the fourth pixel region value and the two or more distinct values corresponding to the fourth individual pixel region;
rendering the tile of pixels, wherein rendering the tile of pixels comprises rasterization comprising applying at least one of a visibility function or a shading function, and wherein rendering the tile of pixels comprises applying at least one of a super-sampling anti-aliasing technique or a multi-sampling anti-aliasing technique;
applying, prior to storing, a compression to the graphics data;
determining a number of bits for the graphics data, wherein the graphics data comprises a plurality of pixel region values corresponding to the individual pixels of the tile, wherein the plurality of pixel region values comprises the pixel region value, the second pixel region value, and the third pixel region value, wherein the graphics data further comprises a second plurality of values, wherein the second plurality of values comprises fewer values than the plurality of values, wherein the second plurality of values comprises the single distinct value associated with the individual pixel region, the two distinct values, and the three or more distinct values, and wherein the graphics data further comprises a plurality of pixel indicator values corresponding to the second pixel region, and wherein the plurality of pixel indicator values comprises the first pixel indicator value;
accessing the graphics data, wherein accessing the graphics data comprises at least one of reading the graphics data from the memory or reading and decompressing the graphics data;
determining a number of values in the graphics data based at least in part on the graphics data; and
wherein determining the plurality of values associated with individual pixels of the tile of pixels comprises:
distributing the first value of the two distinct values to the individual pixel in the second pixel region based at least in part on the second pixel region value and the individual pixel indicator value;
distributing the first value of the two distinct values to a first pixel in the second pixel region based at least in part on the first pixel being the first pixel in an order of pixels for the second pixel region; and
distributing the three or more distinct values to pixels of the third pixel region,
wherein determining the subset of values associated with the subset of individual pixels corresponding to the individual pixel region comprise the single distinct value comprises comparing the subset of values,
wherein the plurality of values comprise at least one of color values, surface normal values, or multi-sampling anti-aliasing color plane values,
wherein the tile of pixels comprises an 8 pixels wide by 4 pixels high tile of pixels, wherein each pixel region comprises a 2 pixel wide by 2 pixel high region of pixels, and wherein the plurality of pixel regions comprise 8 pixel regions, and
wherein the bit value comprises a bit value of one, the second bit value comprises a bit value of two, and the third bit value comprises a bit value of zero.

23. A system for providing compression in graphics rendering on a computer, comprising:
a graphics buffer;
a graphics processing unit comprising a graphics data codec module, wherein the graphics processing unit is communicatively coupled to the graphics buffer and wherein the graphics data codec module is configured to:
determine a plurality of values associated with individual pixels of a tile of pixels;
determine, based at least in part on the tile of pixels, a plurality of pixel regions, wherein each pixel region comprises a corresponding subset of the individual pixels;
determine, for an individual pixel region of the plurality of pixel regions, the subset of values associated with the subset of individual pixels corresponding to the individual pixel region comprises a single distinct value;
set a pixel region value for the individual pixel region to a bit value indicating the individual pixel region comprises the single distinct value;
store, in the graphics buffer, graphics data comprising the pixel region value and the single distinct value associated with the individual pixel region;
access the graphics data;
determine a number of values in the graphics data based at least in part on the graphics data; and determine the plurality of values associated with individual pixels of the tile of pixels based at least in part on the accessed graphics data, wherein determination of the plurality of values associated with individual pixels of the tile of pixels comprises: distributing the single distinct value to each pixel of the individual pixel region based at least in part on the pixel region value.

24. The system of claim 23, wherein the graphics data codec module is further configured to:
determine, for a second individual pixel region of the plurality of pixel regions, the subset of values associated with second individual pixels in the second individual pixel region comprises two or more distinct values;
set a second pixel region value for the second individual pixel region to a second bit value indicating the second individual pixel region comprises the two or more distinct values, wherein the graphics data comprises the second pixel region value and the two or more distinct values corresponding to the second individual pixel region.

25. The system of claim 23, wherein the graphics data codec module is further configured to:
determine, for a second individual pixel region of the plurality of pixel regions, the subset of values associated with second individual pixels in the second individual pixel region comprises two distinct values;
set a second pixel region value for the second individual pixel region to a second bit value indicating the second individual pixel region comprises two distinct values; and
set, for an individual pixel in the second pixel region, an individual pixel indicator value indicating the individual pixel is associated with a first value of the two distinct values, wherein the graphics data comprises the second pixel region value, the individual pixel indicator value, and the two distinct values.

26. The system of claim 23, wherein the graphics data codec module is further configured to:
determine, for a second individual pixel region of the plurality of pixel regions, the subset of values associated with second individual pixels in the second individual pixel region comprises two distinct values;
set a second pixel region value for the second individual pixel region to a second bit value indicating the second individual pixel region comprises two distinct values;
set, for an individual pixel in the second pixel region, an individual pixel indicator value indicating the individual pixel is associated with a first value of the two distinct values, wherein the graphics data comprises the second pixel region value, the individual pixel indicator value, and the two distinct values;
determine, for a third individual pixel region of the plurality of pixel regions, the subset of values associated with third individual pixels in the third individual pixel region comprises three or more distinct values;
set a third pixel region value for the third individual pixel region to a third bit value indicating the third individual pixel region comprises the three or more distinct values, wherein the graphics data comprises the third pixel region value and the three or more distinct values corresponding to the third individual pixel region.

27. The system of claim 23, wherein the graphics data codec module is further configured to:
determine, for a second individual pixel region of the plurality of pixel regions, the subset of values associated with second individual pixels in the second individual pixel region comprises two distinct values;
set a second pixel region value for the second individual pixel region to a second bit value indicating the second individual pixel region comprises two distinct values;
set, for an individual pixel in the second pixel region, an individual pixel indicator value indicating the individual pixel is associated with a first value of the two distinct values, wherein the graphics data comprises the second pixel region value, the individual pixel indicator value, and the two distinct values;
determine, for a third individual pixel region of the plurality of pixel regions, the subset of values associated with third individual pixels in the third individual pixel region comprises three or more distinct values;
set a third pixel region value for the third individual pixel region to a third bit value indicating the third individual pixel region comprises the three or more distinct values, wherein the graphics data comprises the third pixel region value and the three or more distinct values corresponding to the third individual pixel region, wherein the bit value comprises a bit value of one, the second bit value comprises a bit value of two, and the third bit value comprises a bit value of zero.

28. The system of claim 23, further comprising:
a display device configured to display output image data based at least in part on the graphics data,
wherein the graphics data codec module is further configured to:
determine, for a second individual pixel region of the plurality of pixel regions, the subset of values associated with second individual pixels in the second individual pixel region comprises two distinct values;
set a second pixel region value for the second individual pixel region to a second bit value indicating the second individual pixel region comprises two distinct values;
set, for an individual pixel in the second pixel region, an individual pixel indicator value indicating the individual pixel is associated with a first value of the two distinct values, wherein the graphics data comprises the second pixel region value, the individual pixel indicator value, and the two distinct values;
determine, for a third individual pixel region of the plurality of pixel regions, the subset of values associated with third individual pixels in the third individual pixel region comprises three or more distinct values;
set a third pixel region value for the third individual pixel region to a third bit value indicating the third individual pixel region comprises the three or more distinct values, wherein the graphics data comprises the third pixel region value and the three or more distinct values corresponding to the third individual pixel region, and wherein the three or more distinct values comprise four distinct values;
determine, for a fourth individual pixel region of the plurality of pixel regions, the subset of values associated with fourth individual pixels in the fourth individual pixel region comprises two or more distinct values;
set a fourth pixel region value for the fourth individual pixel region to a fourth bit value indicating the fourth individual pixel region comprises the two or more distinct values, wherein the graphics data comprises the fourth pixel region value and the two or more distinct values corresponding to the fourth individual pixel region;

render the tile of pixels, wherein rendering the tile of pixels comprises rasterization comprising applying at least one of a visibility function or a shading function, and wherein to render the tile of pixels comprises applying at least one of a super-sampling anti-aliasing technique, or a multi-sampling anti-aliasing technique;

apply, prior to storing, a compression to the graphics data;

determine a number of bits for the graphics data, wherein the graphics data comprises a plurality of pixel region values corresponding to the individual pixels of the tile, wherein the plurality of pixel region values comprises the pixel region value, the second pixel region value, and the third pixel region value, wherein the graphics data further comprises a second plurality of values, wherein the second plurality of values comprises fewer values than the plurality of values, wherein the second plurality of values comprises the single distinct value associated with the individual pixel region, the two distinct values, and the three or more distinct values, and wherein the graphics data further comprises a plurality of pixel indicator values corresponding to the second pixel region, and wherein the plurality of pixel indicator values comprises the first pixel indicator value;

access the graphics data, wherein to access the graphics data comprises at least one of reading the graphics data from the memory or reading and decompressing the graphics data;

wherein determination of the plurality of values associated with individual pixels of the tile of pixels comprises:
  distributing the first value of the two distinct values to the individual pixel in the second pixel region based at least in part on the second pixel region value and the individual pixel indicator value;
  distributing the first value of the two distinct values to a first pixel in the second pixel region based at least in part on the first pixel being the first pixel in an order of pixels for the second pixel region; and
  distributing the three or more distinct values to pixels of the third pixel region, wherein determination of the subset of values associated with the subset of individual pixels corresponding to the individual pixel region comprise the single distinct value comprises comparing the subset of values, wherein the plurality of values comprise at least one of color values, surface normal values, or multi-sampling anti-aliasing color plane values, wherein the tile of pixels comprises an 8 pixels wide by 4 pixels high tile of pixels, wherein each pixel region comprises a 2 pixel wide by 2 pixel high region of pixels, and wherein the plurality of pixel regions comprise 8 pixel regions, and wherein the bit value comprises a bit value of one, the second bit value comprises a bit value of two, and the third bit value comprises a bit value of zero.

29. At least one non-transitory machine readable medium comprising a plurality of instructions that in response to being executed on a computing device, cause the computing device to provide compression in graphics rendering by:
  determining a plurality of values associated with individual pixels of a tile of pixels;
  determining, based at least in part on the tile of pixels, a plurality of pixel regions, wherein each pixel region comprises a corresponding subset of the individual pixels;
  determining, for an individual pixel region of the plurality of pixel regions, the subset of values associated with the subset of individual pixels corresponding to the individual pixel region comprises a single distinct value;
  setting a pixel region value for the individual pixel region to a bit value indicating the individual pixel region comprises the single distinct value;
  storing, in memory, graphics data comprising the pixel region value and the single distinct value associated with the individual pixel region;
  determining a number of values in the graphics data based at least in part on the graphics data; and
  determining the plurality of values associated with individual pixels of the tile of pixels based at least in part on the accessed graphics data, wherein determining the plurality of values associated with individual pixels of the tile of pixels comprises: distributing the single distinct value to each pixel of the individual pixel region based at least in part on the pixel region value.

30. The non-transitory machine readable medium of claim 29, further comprising instructions that in response to being executed on the computing device, cause the computing device to provide compression in graphics rendering by:
  determining, for a second individual pixel region of the plurality of pixel regions, the subset of values associated with second individual pixels in the second individual pixel region comprises two distinct values;
  setting a second pixel region value for the second individual pixel region to a second bit value indicating the second individual pixel region comprises two distinct values;
  setting, for an individual pixel in the second pixel region, an individual pixel indicator value indicating the individual pixel is associated with a first value of the two distinct values, wherein the graphics data comprises the second pixel region value, the individual pixel indicator value, and the two distinct values;
  determining, for a third individual pixel region of the plurality of pixel regions, the subset of values associated with third individual pixels in the third individual pixel region comprises three or more distinct values;
  setting a third pixel region value for the third individual pixel region to a third bit value indicating the third individual pixel region comprises the three or more distinct values, wherein the graphics data comprises the third pixel region value and the three or more distinct values corresponding to the third individual pixel region, and wherein the three or more distinct values comprise four distinct values;
  determining, for a fourth individual pixel region of the plurality of pixel regions, the subset of values associated with fourth individual pixels in the fourth individual pixel region comprises two or more distinct values;
  setting a fourth pixel region value for the fourth individual pixel region to a fourth bit value indicating the fourth individual pixel region comprises the two or more distinct values, wherein the graphics data comprises the fourth pixel region value and the two or more distinct values corresponding to the fourth individual pixel region;
  rendering the tile of pixels, wherein rendering the tile of pixels comprises rasterization comprising applying at least one of a visibility function or a shading function, and wherein rendering the tile of pixels comprises applying at least one of a super-sampling anti-aliasing technique or a multi-sampling anti-aliasing technique;

applying, prior to storing, a compression to the graphics data;

determining a number of bits for the graphics data, wherein the graphics data comprises a plurality of pixel region values corresponding to the individual pixels of the tile, wherein the plurality of pixel region values comprises the pixel region value, the second pixel region value, and the third pixel region value, wherein the graphics data further comprises a second plurality of values, wherein the second plurality of values comprises fewer values than the plurality of values, wherein the second plurality of values comprises the single distinct value associated with the individual pixel region, the two distinct values, and the three or more distinct values, and wherein the graphics data further comprises a plurality of pixel indicator values corresponding to the second pixel region, and wherein the plurality of pixel indicator values comprises the first pixel indicator value;

accessing the graphics data, wherein accessing the graphics data comprises at least one of reading the graphics data from the memory or reading and decompressing the graphics data;

wherein determining the plurality of values associated with individual pixels of the tile of pixels comprises:

distributing the first value of the two distinct values to the individual pixel in the second pixel region based at least in part on the second pixel region value and the individual pixel indicator value;

distributing the first value of the two distinct values to a first pixel in the second pixel region based at least in part on the first pixel being the first pixel in an order of pixels for the second pixel region; and distributing the three or more distinct values to pixels of the third pixel region, wherein determining the subset of values associated with the subset of individual pixels corresponding to the individual pixel region comprise the single distinct value comprises comparing the subset of values, wherein the plurality of values comprise at least one of color values, surface normal values, or multi-sampling anti-aliasing color plane values, wherein the tile of pixels comprises an 8 pixels wide by 4 pixels high tile of pixels, wherein each pixel region comprises a 2 pixel wide by 2 pixel high region of pixels, and wherein the plurality of pixel regions comprise 8 pixel regions, and wherein the bit value comprises a bit value of one, the second bit value comprises a bit value of two, and the third bit value comprises a bit value of zero.

* * * * *